(12) United States Patent
Taherzadeh Boroujeni et al.

(10) Patent No.: US 12,464,570 B2
(45) Date of Patent: Nov. 4, 2025

(54) MULTIPLE SIMULTANEOUS SSBS WITH SSB-SPECIFIC RACH OCCASIONS OR PREAMBLE SUBSETS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Xiaoxia Zhang, San Diego, CA (US); Jing Sun, San Diego, CA (US); Junyi Li, Franklin Park, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 17/302,545

(22) Filed: May 5, 2021

(65) Prior Publication Data

US 2022/0361253 A1 Nov. 10, 2022

(51) Int. Cl.
*H04W 74/0833* (2024.01)
*H04L 27/26* (2006.01)
*H04W 74/08* (2009.01)

(52) U.S. Cl.
CPC ... *H04W 74/0841* (2013.01); *H04L 27/26025* (2021.01); *H04L 27/2607* (2013.01); *H04W 74/0833* (2013.01); *H04W 74/0891* (2013.01)

(58) Field of Classification Search
CPC .............. H04B 7/0695; H04B 7/06952; H04B 7/06954; H04B 7/096956; H04B 7/06958; H04B 7/0696; H04B 7/06962; H04B 7/06964; H04B 7/06966; H04B 7/06968; H04L 5/001; H04L 5/0023; H04L 5/0048; H04L 5/0091; H04L 27/26025; H04L 27/2607; H04L 27/261; H04W 56/0045; H04W 56/0055; H04W 74/0833; H04W 74/0836; H04W 74/0838; H04W 74/0841; H04W 74/0891
See application file for complete search history.

(56) References Cited

U.S. PATENT DOCUMENTS

| | | | | |
|---|---|---|---|---|
| 2020/0059922 | A1* | 2/2020 | John Wilson | H04L 5/0053 |
| 2020/0154377 | A1* | 5/2020 | Qian | H04W 72/0446 |
| 2020/0344815 | A1* | 10/2020 | Svedman | H04W 74/0891 |
| 2021/0136828 | A1* | 5/2021 | Hakola | H04W 74/0833 |

(Continued)

*Primary Examiner* — Thomas R Cairns
(74) *Attorney, Agent, or Firm* — Arent Fox, LLP

(57) ABSTRACT

Aspects of the present disclosure allow a base station to simultaneously send SSBs to a UE and to associate different ROs or designated subsets of preambles with the simultaneously transmitted SSBs. The base station may configure a time or frequency offset for different ROs, or a number of preamble cyclic shifts associated with the SSBs. The base station then simultaneously sends a plurality of SSBs to the UE, where each of the SSBs is associated with a different beam, and where each of the SSBs is associated with a different RO or a designated subset of preambles. After the UE simultaneously obtains the SSBs from the base station, the UE may determine the offset for one of the different ROs, or the number of preamble cyclic shifts associated with one of the SSBs. The UE may then send a preamble to the base station in response to the determination.

30 Claims, 17 Drawing Sheets

(56) References Cited

U.S. PATENT DOCUMENTS

| | | | |
|---|---|---|---|
| 2021/0185734 A1* | 6/2021 | Li | H04W 74/0808 |
| 2021/0307061 A1* | 9/2021 | Huang | H04W 74/0808 |
| 2022/0240326 A1* | 7/2022 | Rune | H04W 74/0866 |
| 2022/0330291 A1* | 10/2022 | Choi | H04W 72/1268 |
| 2022/0330348 A1* | 10/2022 | Wei | H04W 72/1263 |
| 2023/0269790 A1* | 8/2023 | Müller | H04W 76/10 370/329 |
| 2023/0292281 A1* | 9/2023 | Li | H04L 5/005 |
| 2024/0049278 A1* | 2/2024 | Cheng | H04W 74/006 |

\* cited by examiner

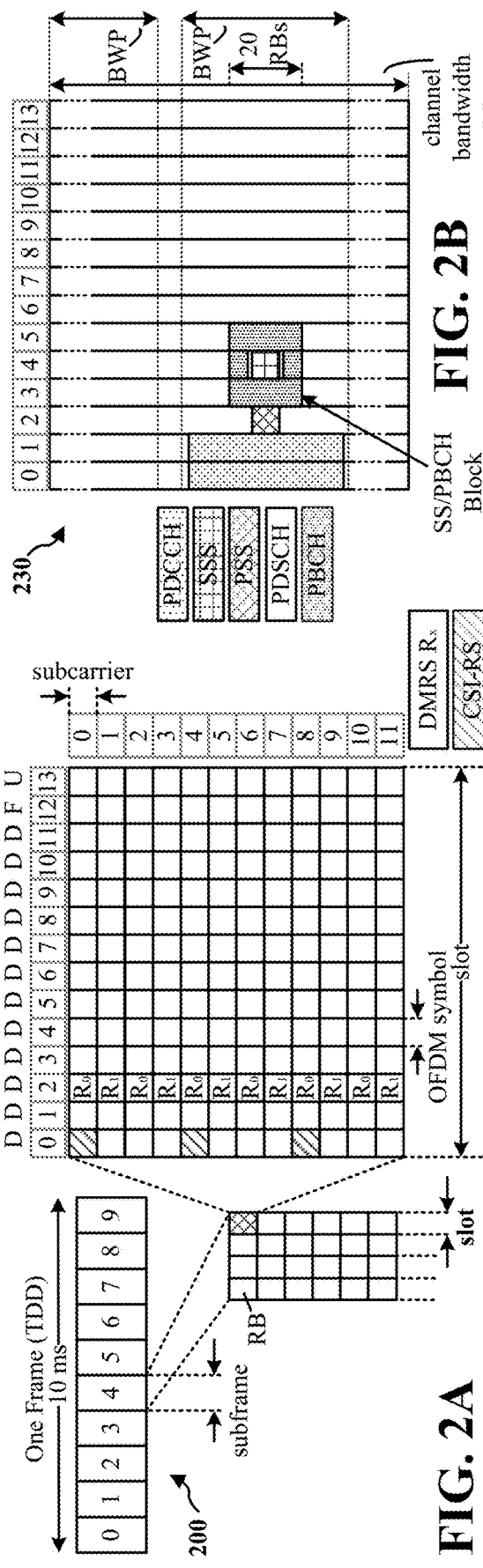
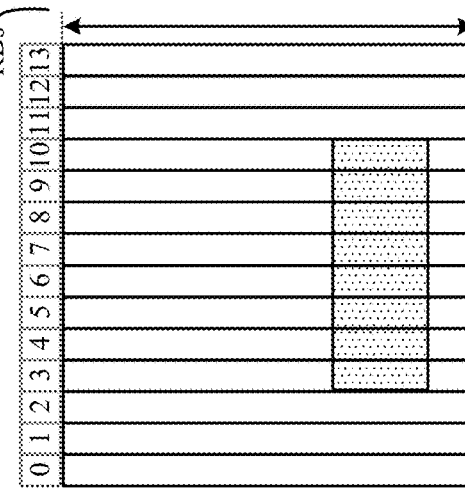
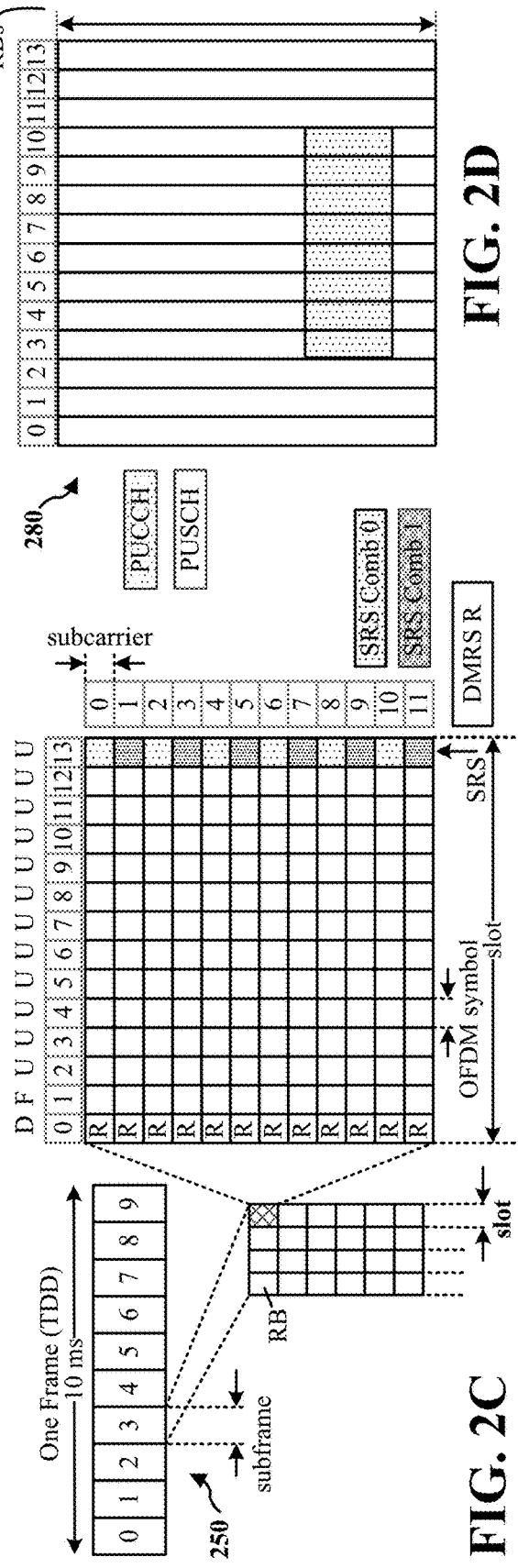
FIG. 2A  FIG. 2B  FIG. 2C  FIG. 2D

MULTIPLE SIMULTANEOUS SSBS WITH SSB-SPECIFIC RACH OCCASIONS OR PREAMBLE SUBSETS

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE simultaneously obtains a plurality of synchronization signal blocks (SSBs) from a base station, where each of the SSBs is associated with a different beam, and where each of the SSBs is associated with a different random access channel (RACH) occasion or a designated subset of preambles.

In an aspect of the disclosure, a method, a computer-readable medium, and an apparatus are provided. The apparatus may be a base station. The base station simultaneously sends a plurality of SSBs to a UE, where each of the SSBs is associated with a different beam, and where each of the SSBs is associated with a different RACH occasion or a designated subset of preambles.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
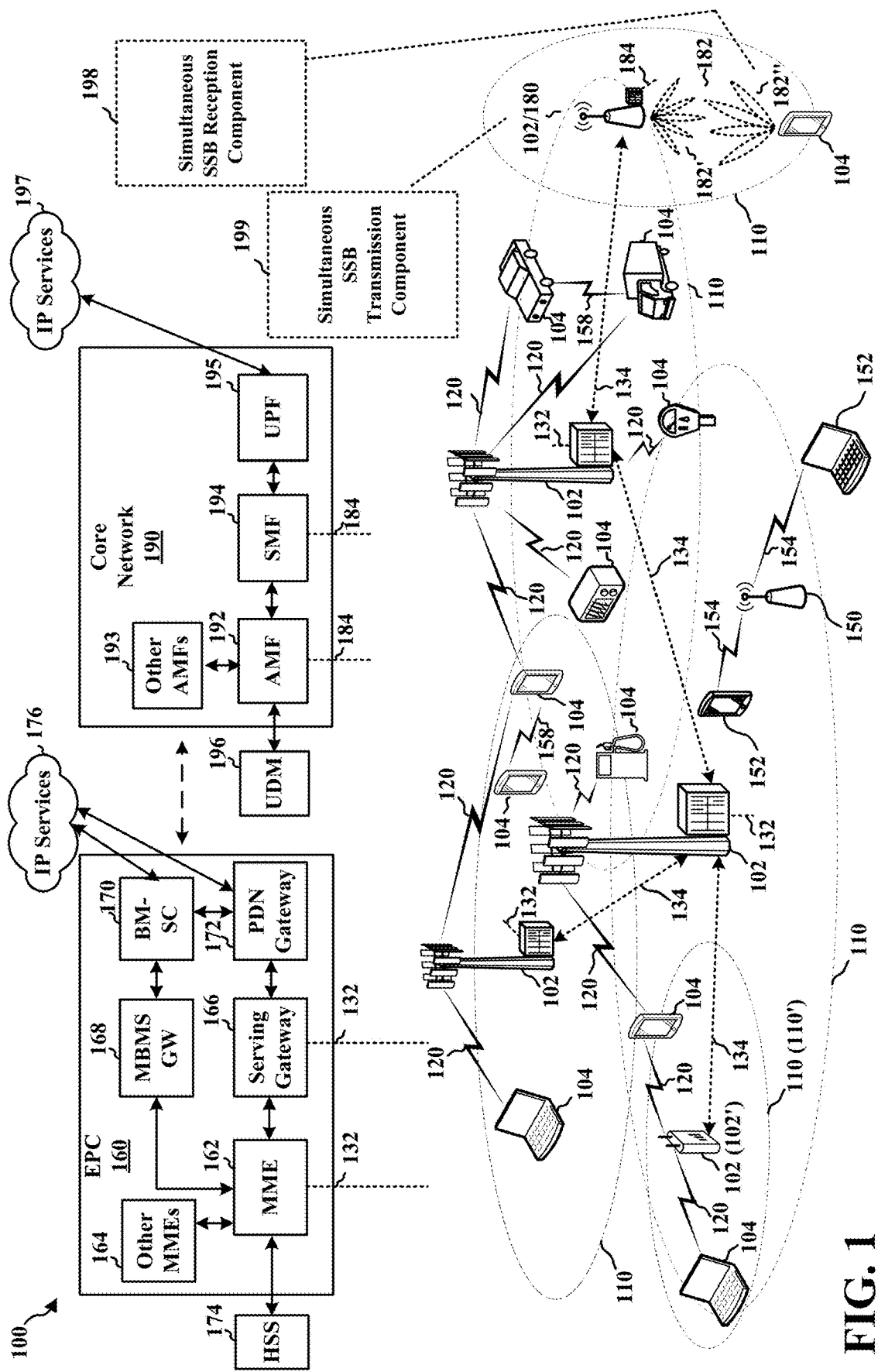
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The UE may search for a cell of a base station for initial access (e.g. during a RACH procedure), for cell re-selection (e.g. during a handover), or for other purposes. To derive system information to access the cell, the UE may obtain an SSB from the base station. For example, the base station may configure an SS burst set including a set of one or more orthogonal SSBs, where each SSB in the SS burst set is transmitted to the UE on a different beam without any overlapping symbols between the SSBs. The UE may receive each SSB over multiple reception beams, after which the UE may determine the pair of transmission and reception beams which result in the highest signal strength (e.g., reference signal receive power (RSRP) or receive signal strength indicator (RSSI)) (i.e., a best beam pair based on RSRP or RSSI measurements). Upon determining the best beam pair, the UE may report a RACH preamble to the base station in a RACH occasion (RO) corresponding to the orthogonal SSB associated with the best beam pair. The UE may then acquire and maintain time and frequency synchronization with the cell in response to that SSB.

When the UE receives orthogonal SSBs over different transmission beams, each SSB may be associated with a RACH occasion (RO). A RO includes the time-frequency resources in which a UE may send a RACH preamble in response to identifying a best beam pair from an SSB (e.g., during beam training). Typically, the base station provides a RACH configuration configuring a mapping between SSBs and RACH occasions and preambles, including a number of ROs allocated in the frequency domain at a same location in the time domain (e.g., via parameter msg1-FDM or another name), and a number of SSBs mapped to an RO as well as a number of preamble indices mapped to a single SSB (e.g., via parameter ssb-perRACH-OccasionAndCB-PreamblesPerSSB or another name). Based on the RO in which the UE transmits a preamble, the base station may determine the SSB from which the UE identified the best beam pair.

Thus, SSBs may be orthogonally transmitted in different time resources (e.g., symbols) respectively over different beams, and preambles may be transmitted in ROs associated with the orthogonal SSBs. However, such orthogonality may not be scalable in multi-cell environments where the UE receives SSBs from base stations or transmission reception points (TRPs) in multiple cells. For instance, if multiple base stations or TRPs each transmit a SS burst set including multiple, orthogonal SSBs over different transmission beams, the total number of SSBs may improperly exceed an SS burst set timing window. For example, if each base station transmits 64 SSBs in different time resources with respect to each other so that all SSBs are orthogonal (none of the SSBs overlap with each other), the total number of SSBs may exceed the burst set timing window and the UE may possibly not receive and measure all the SSBs.

However, UEs may include RF circuitry or other capability that allows the UEs to perform multiple, simultaneous RF measurements. For example, a UE may include multiple radio frequency (RF) chains (e.g., multiple mixers, analog-to-digital converters (ADCs), digital-to-analog converters (DACs), or other components), as well as multiple antenna arrays or panels, which allow the UE to perform multiple RSRP or reference signal receive quality (RSRQ) measurements at the same time. Therefore, it would be helpful to leverage this capability of UEs for simultaneous measurements by allowing such UEs to receive multiple SSBs over different transmission beams at the same time (potentially from base stations or TRPs in different cells), in order to address the lack of scalability of orthogonal SSBs in multi-cell environments.

Yet, conventional RACH configurations associating ROs and preambles to SSBs such as described above may be inadequate in cases where a base station transmits simultaneous SSBs. For instance, when the base station configures the number of ROs allocated in the frequency domain (e.g., via parameter msg1-FDM or another name), and the number of SSBs mapped to an RO (e.g., via parameter ssb-per-RACH-OccasionAndCB-PreamblesPerSSB or another name), the configuration assumes that the SSBs are each transmitted at different times. For instance, the first SSB in time may be mapped to a first RO (e.g. RO 0), the next SSB in time may be mapped to a second RO (e.g., RO 1), and so forth. However, if the base station transmits multiple SSBs at once, the UE may not be able to determine which RO corresponds to the SSB that the UE identified as being associated with the best beam pair (e.g., RO 0 or RO 1). Similarly, when the base station configures the number of preamble indices mapped to a single SSB (e.g., via parameter ssb-perRACH-OccasionAndCB-PreamblesPerSSB or another name), the configuration also assumes that the SSBs are each transmitted at different times. For instance, the first SSB in time may be mapped to one consecutive group of preambles (e.g. preambles 0-7), the second SSB in time may be mapped to the next consecutive group of preambles (e.g., preambles 8-15, etc.), and so forth. However, the base station does not designate specific preambles associated with different simultaneously transmitted SSBs. For example, the base station may not associate a specific group of inconsecutive preambles (e.g., preambles 1, 3, 5, 9, 17, 36 or some other designated subset of preambles) with different simultaneously transmitted SSBs.

Accordingly, aspects of the present disclosure allow a base station (or TRP) to transmit simultaneous SSBs to a UE respectively over different beams, where such SSBs do not overlap with SSBs from other base stations (or TRPs). In this way, a UE may better detect the transmission beams carrying SSBs from different cells or TRPs. Moreover, aspects of the present disclosure allow the base station to associate different ROs or designated subsets of preambles with different simultaneously transmitted SSBs. Thus, the base station may differentiate RACH preambles received from the UE in response to simultaneously transmitted SSBs, while the UE may determine the time-frequency resources in which to transmit preambles responsive to such simultaneously transmitted SSBs. Moreover, the base station may receive preambles responsive to simultaneous SSBs in separate ROs, thus providing for improved uplink reception and beamforming.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a simultaneous SSB reception component 198 that is configured to simultaneously obtain a plurality of SSBs from a base station, where each of the SSBs is associated with a different beam; and where each of the SSBs is associated with a different RACH occasion or a designated subset of preambles.

Referring again to FIG. 1, in certain aspects, the base station 102/180 may include a simultaneous SSB transmission component 199 that is configured to simultaneously send a plurality of SSBs to a UE, where each of the SSBs is associated with a different beam; and where each of the SSBs is associated with a different RACH occasion or a designated subset of preambles.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
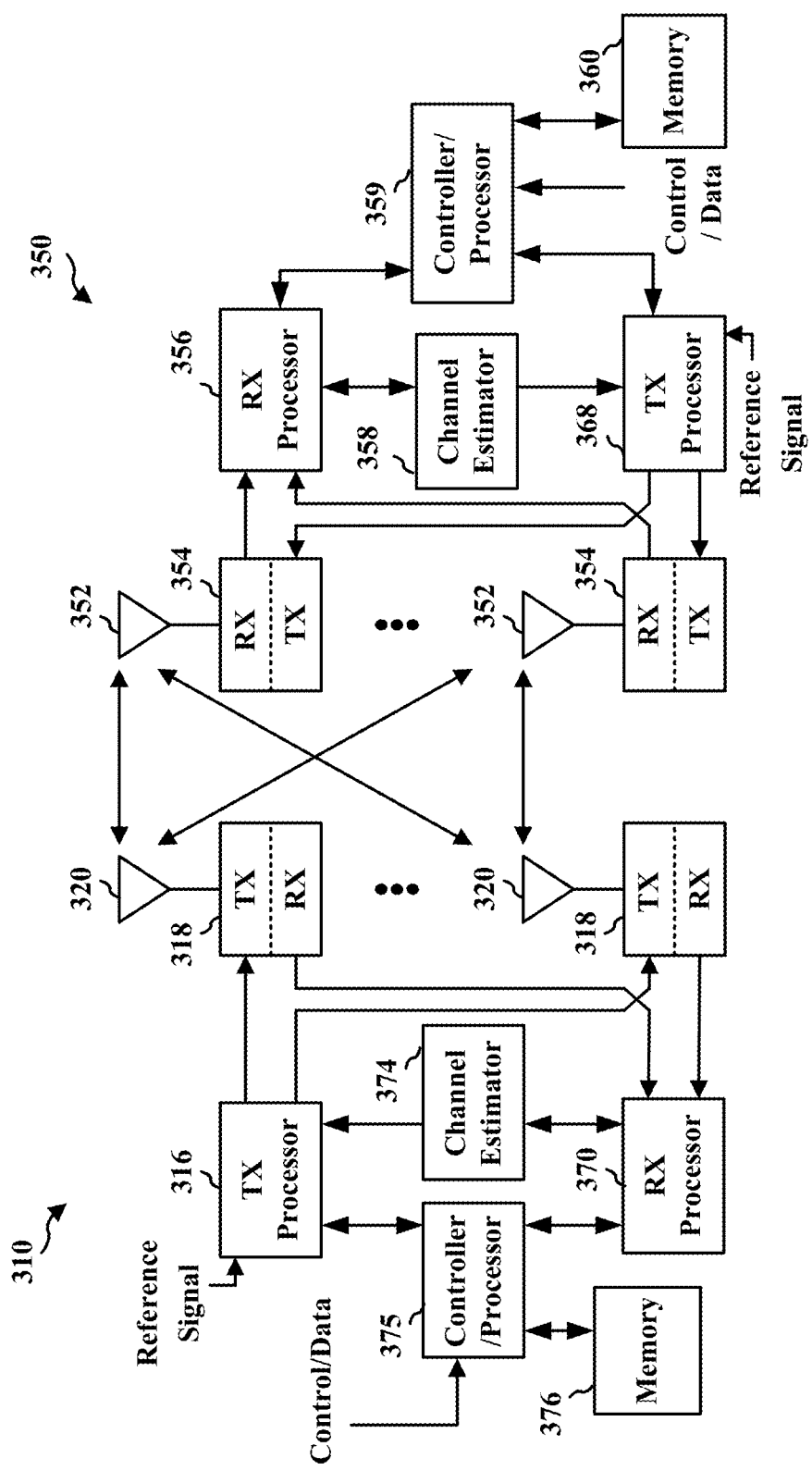
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with simultaneous SSB reception component 198 of FIG. 1.

At least one of the TX processor 316, the RX processor 370, and the controller/processor 375 may be configured to perform aspects in connection with simultaneous SSB transmission component 199 of FIG. 1.

The UE may search for a cell of a base station for initial access (e.g. during a RACH procedure), for cell re-selection (e.g. during a handover), or for other purposes. To derive system information to access the cell, the UE may obtain an SSB including a PSS, an SSS, and a PBCH. The UE may acquire and maintain time and frequency synchronization with the cell in response to the SSB. The UE may also measure RSRP and RSRQ from the synchronization signals for other purposes (e.g. radio link management (RLM) or radio resource management (RRM)).

Figure 4:
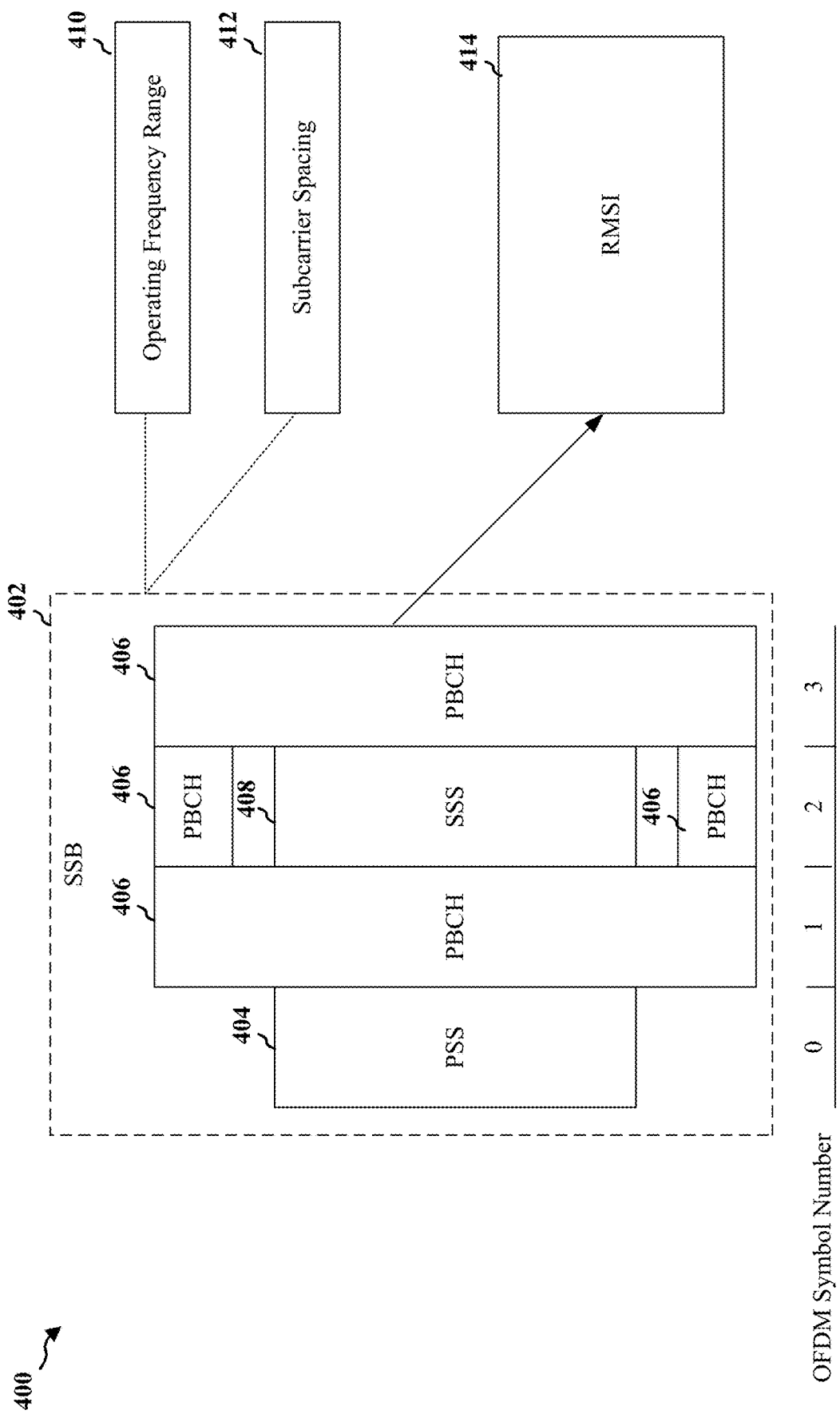
FIG. 4 is a diagram illustrating an example of an SSB.

FIG. 4 illustrates an example 400 of a SSB 402. The SSB 402 generally includes four consecutive symbols in the time domain and over 20 RBs (240 subcarriers) in the frequency domain. A first symbol of the SSB 402 includes a PSS 404, a second symbol of the SSB includes PBCH 406, a third symbol of the SSB includes SSS 408 as well as PBCH 406, and a fourth symbol of the SSB includes PBCH 406. The total bandwidth of the SSB 402 may depend on an operating frequency range 410 or a subcarrier spacing (SCS) 412 of the SSB. For instance, if the operating frequency range of the cell is FR1 (e.g., at most 6 GHz) or the SCS of the SSB is 30 kHz or less, the SSB bandwidth may be at most 7.2 MHz, while if the operating frequency range of the cell is FR2 (e.g., greater than 6 GHz) or the SCS of the SSB is 120 kHz or more, the SSB bandwidth may be at least 28.8 MHz. Alternatively, the SSB bandwidth may be different in other examples.

The PBCH 406 may also include a master information block (MIB), which provides the UE with parameters for acquiring RMSI 414 (e.g., SIB1). That is, SSB 402 may schedule RMSI 414 through the MIB. For instance, the MIB may include a control resource set 0 (CORESET 0) which includes configured time or frequency resources for a PDCCH that schedules a PDSCH carrying SIB1. The RMSI 414 (or SIB1) scheduled by the SSB 402 may include random access parameters, information regarding the availability and scheduling of other SIBs, radio resource configuration information common for multiple UEs, or other system information.

The PBCH 406 may also indicate an SSB index for the SSB 402. For instance, when the operating frequency range of the cell is FR1, the SSB index may be implicitly indicated in the PBCH by a PBCH scrambling sequence. For example, when scrambling the PBCH 406, the base station may select one of eight PBCH scrambling sequences, with each scrambling sequence corresponding to one of eight SSB indices. Thus, the UE may determine the SSB index of an SSB based on the PBCH scrambling sequence of that SSB. Moreover, when the operating frequency range of the cell is FR2, the SSB index may also be explicitly indicated in the PBCH by additional bits in the PBCH payload. For example, the base station may include three most significant bits (MSBs) of the SSB index in the PBCH payload, with the remaining three least significant bits (LSBs) of the SSB index implicitly indicated by the PBCH scrambling sequence. Thus, the UE may determine the SSB index of an SSB based on both the PBCH payload and the PBCH scrambling sequence of that SSB.

The base station may transmit an SSB according to a configured periodicity. For example, the base station may transmit SSB periodically every 5 ms, 10 ms, 20 ms, 40 ms, 80 ms, or 160 ms. The base station may also configure an SSB-based RRM Measurement Timing Configuration (SMTC) window informing the UE regarding an SSB measurement window periodicity and timing for SSB measurements. For example, the base station may configure the UE to measure SSBs periodically every 5 ms, 10 ms, 20 ms, 40 ms, 80 ms, or 160 ms. The SMTC window periodicity may be the same as the SSB periodicity. The UE may receive and measure SSBs within each SMTC window and report measurements accordingly back to the base station.

To enable beam-sweeping for PSS, SSS and PBCH, the base station may also configure an SS burst set including a set of one or more SSBs, where each SSB in the SS burst set may potentially be transmitted on a different beam (e.g. a different one of the transmit directions 182' in FIG. 1). The UE may similarly receive each SSB on a different beam (e.g. a different one of the receive directions 182" in FIG. 1). For instance, assuming an SSB periodicity of 20 ms or two 10 ms radio frames (and similarly an SMTC window periodicity of 20 ms), the base station may transmit an SSB burst set of one or more SSBs within a first-half or second-half of one of the radio frames (i.e. a 5 ms window within each 20 ms period), with each SSB being transmitted in a different beam. The base station may similarly configure the SMTC window duration to be the same as the SSB window (e.g. 5 ms). Thus, for example, the UE may receive and measure SSBs within a 5 ms window during each 20 ms period and report those measurements back to the base station.

The maximum number of candidate SSBs ($L_{max}$) within each burst set may depend on the carrier frequency of the cell (e.g., operating frequency range 410 in FIG. 4). For example, for frequencies above 6 GHz, at most 64 SSBs may be transmitted within a single SS burst set. Moreover, the starting OFDM symbol index for each candidate SSB within an SS burst set may depend on the carrier frequency of the cell (e.g., operating frequency range 410) and the SCS (e.g., SCS 412 in FIG. 4). For example, for frequencies above 6 GHz, SSBs may be transmitted starting at OFDM symbols 4, 8, 16, and 20 for 120 kHz SCS and starting at OFDM symbols 8, 12, 16, 20, 32, 36, 40, and 44 for 240 kHz SCS.

Figure 5:
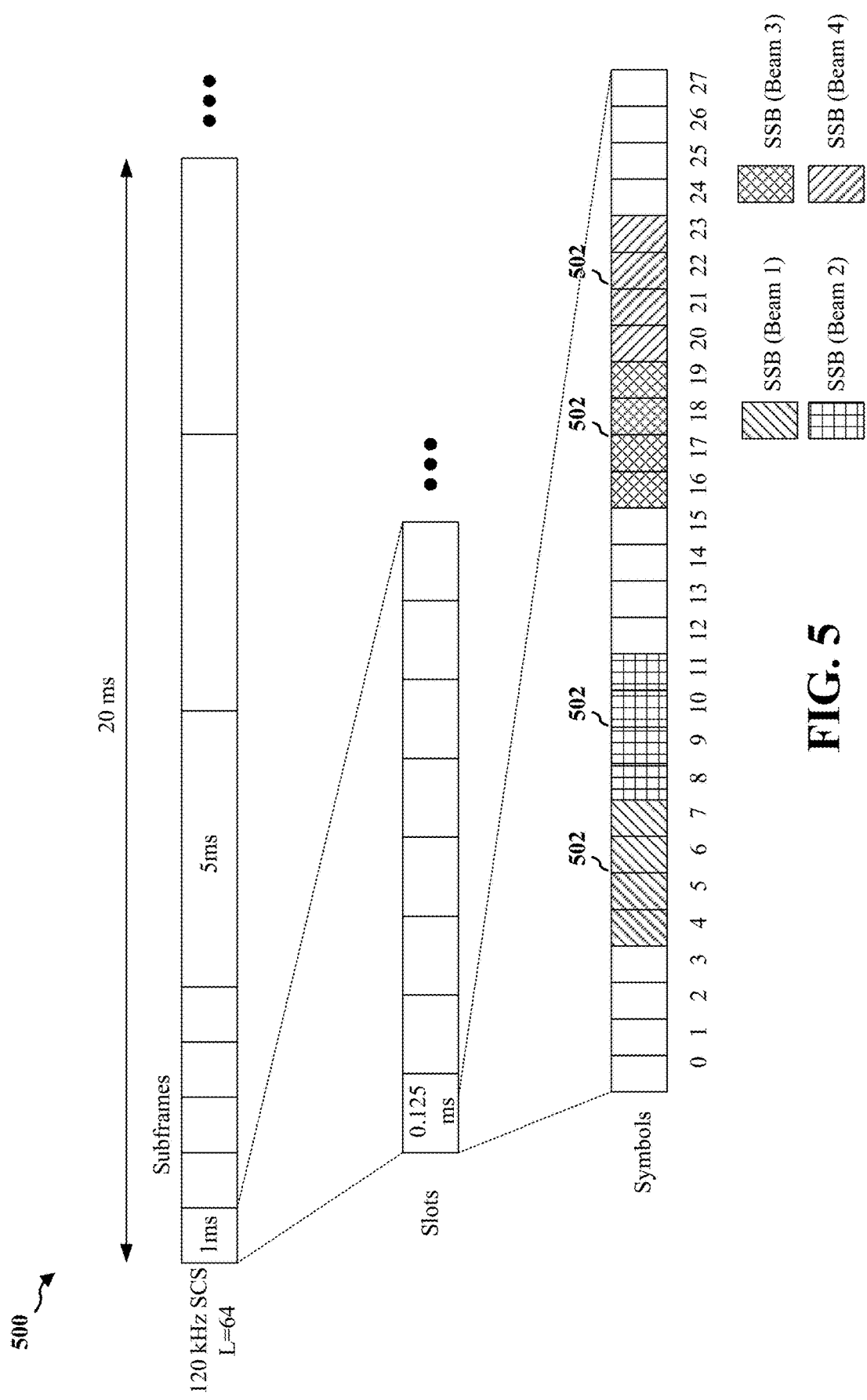
FIG. 5 is a diagram illustrating an example of orthogonal SSBs in a synchronization signal (SS) burst.

FIG. 5 illustrates an example 500 of a timing of candidate SSBs 502 within an SS burst set having a configured SSB periodicity of 20 ms, a SCS of 120 kHz, and 64 candidate SSBs. In this example, each SSB 502 corresponds to a different beam (e.g. each SSB is transmitted in a different one of the transmit directions 182' of FIG. 1), in this case beams 1, 2, 3, and 4. Moreover, as illustrated, each 1 ms subframe at 120 kHz SCS may be divided into eight 0.125 ms slots, with each slot spanning 28 OFDM symbols. Furthermore, each SSB 502 may include four symbols (e.g. SSB 402), where the starting symbol of each SSB begins at OFDM symbols 4, 8, 16, and 20. Thus, each SSB may be orthogonal to each other SSB. For example, the SSB starting at symbol 4 may occupy different symbols than the SSB starting at symbol 8 without any overlapping symbols between the SSBs. Similarly, the SSB starting at symbol 16 may occupy different symbols than the SSB starting at symbol 20 without any overlapping symbols between the SSBs. Similar orthogonal SSB patterns may be configured in other examples at other SCS (e.g. 240 kHz).

Moreover, in mmW frequencies (e.g., FR2 or beyond), a UE and base station may perform beamforming to improve gain and reliability of transmissions and to improve reception of transmitted signals. To establish and retain an optimal beam pair (a transmission beam and a corresponding reception beam) for strong connectivity, the UE and base station may perform beam training. In beam training, a base station transmits a burst of orthogonal SSBs to a UE such as illustrated in the example of FIG. 5, during which the base station transmits each SSB over a different transmission beam (referred to as transmission beam sweeping) and the UE receives each SSB over multiple reception beams (referred to as reception beam sweeping). During transmission or reception beam sweeping, the UE determines a pair of transmission and reception beams which result in the highest signal strength (e.g., RSRP or RSSI) (i.e., the best beam pair based on RSRP or RSSI measurements). Upon determining the best beam pair, the UE reports this pair to the base station in a RACH occasion corresponding to the SSB associated with the best beam pair.

In a four-step contention-based RACH procedure, four messages may be provided between a UE and a base station. For example, during an initial attach procedure, a UE may send a preamble to the base station (e.g. message 1), receive a random access response (RAR) from the base station (e.g. message 2), send an RRC Connection Request message or other payload to the base station (e.g. message 3), and receive an RRC Connection Setup message or other transmission subject to contention resolution from the base station (e.g. message 4). This four-step RACH procedure can be simplified into a two-step RACH procedure in which the UE sends a preamble and a payload in a first message. For example, message A ("msgA") of a two-step RACH procedure may correspond to messages 1 and 3 of the four-step RACH procedure, and message B ("msgB") may correspond to messages 2 and 4 of the four-step RACH procedure. Thus, in the two-step RACH procedure, the UE may send the preamble followed by the payload in a msgA transmission to the base station, while the base station may send the RAR and the RRC response message in a msgB transmission to the UE.

A UE may determine a preamble for RACH by performing cyclic shifts of a base sequence. For instance, the UE may generate a base sequence (e.g., a Zadoff-Chu sequence) based on a root sequence index. Then, the UE may identify a cyclic shift interval based on RRC parameters (e.g., a high speed flag and a zero correlation zone configuration) in system information obtained from the base station. Afterwards, the UE calculates a set of preambles by sequentially increasing the number of cyclic shifts performed on the base sequence (e.g., a number of times the base sequence is shifted by the cyclic shift interval). For instance, the UE may calculate 64 preambles, where preamble 0 is the base sequence (without a cyclic shift), preamble 1 is the result of one cyclic shift to the base sequence, preamble 2 is the result of two cyclic shifts to the base sequence, preamble 3 is the result of three cyclic shifts to the base sequence, and so forth. Afterwards, the UE randomly selects a preamble from the calculated set, and transmits that preamble to the base station during RACH.

When the UE receives orthogonal SSBs over different transmission beams, each SSB may be associated with a RO. A RO includes the time-frequency resources in which a UE may send a preamble, e.g., message 1 of a four-step RACH procedure or msgA of a two-step RACH procedure, in response to identifying a best beam pair from an SSB (e.g., during beam training). Generally, the base station provides a RACH configuration configuring a mapping between SSBs and RACH occasions and preambles, including a number of ROs allocated in the frequency domain at a same location in the time domain (e.g., via parameter msg1-FDM or another name), and a number of SSBs mapped to an RO as well as a number of preamble indices mapped to a single SSB (e.g., via parameter ssb-perRACH-OccasionAndCB-PreamblesPerSSB or another name). Based on the RO in which the UE transmits a preamble, the base station may determine the SSB from which the UE identified the best beam pair.

Figure 6:
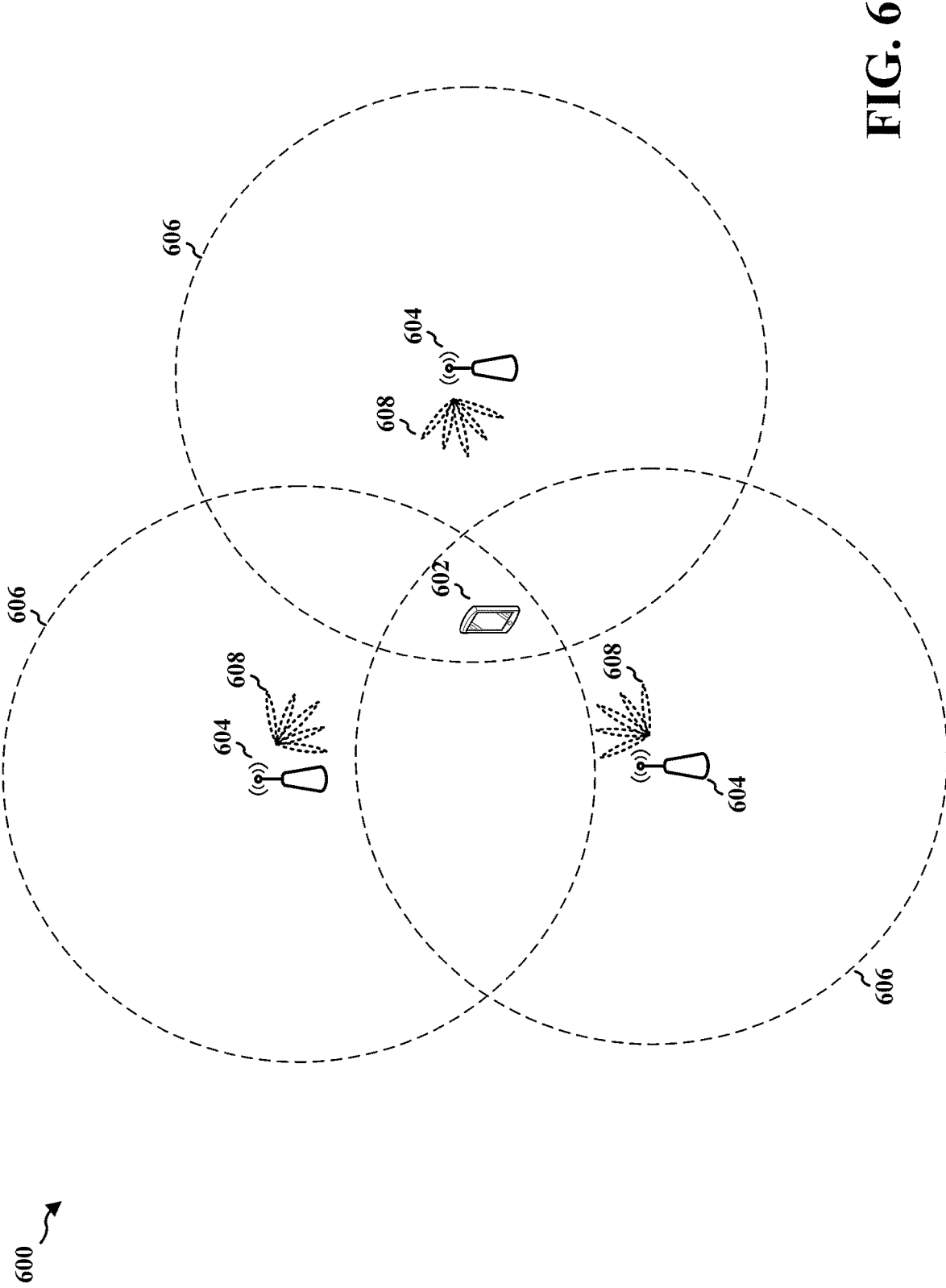
FIG. 6 is a diagram illustrating an example of a UE in communication with base stations in multiple cells.

Thus, SSBs may be orthogonally transmitted in different time resources (e.g., symbols) respectively over different beams, and preambles may be transmitted in ROs associated with the orthogonal SSBs. However, such orthogonality may not be scalable in multi-cell environments where the UE receives SSBs from base stations or transmission reception points (TRPs) in multiple cells. For instance, FIG. 6 illustrates an example 600 of a UE 602 in communication with a base station 604 in multiple cells 606. In such case, if each base station 604 transmits a SS burst set including multiple, orthogonal SSBs over different transmission beams 608, the total number of SSBs may improperly exceed the SS burst set timing window. For example, if each base station transmits 64 SSBs in different time resources with respect to each other so that all SSBs are orthogonal (none of the SSBs overlap with each other), the total number of SSBs may exceed the 5 ms burst set window and the UE may possibly not receive and measure all the SSBs.

However, UEs may include RF circuitry or other capability that allows the UEs to perform multiple, simultaneous RF measurements. For example, a UE may include multiple RF chains (e.g., multiple mixers, ADCs, DACs, or other components), as well as multiple antenna arrays or panels, which allow the UE to perform multiple RSRP or RSRQ measurements at the same time. Therefore, it would be helpful to leverage this capability of UEs for simultaneous measurements by allowing such UEs to receive multiple SSBs over different transmission beams at the same time (potentially from base stations or TRPs in different cells), in order to address the lack of scalability of orthogonal SSBs in multi-cell environments.

Yet, conventional RACH configurations associating ROs and preambles to SSBs such as described above may be inadequate in cases where a base station transmits simultaneous SSBs. For instance, when the base station configures the number of ROs allocated in the frequency domain (e.g., via parameter msg1-FDM or another name), and the number of SSBs mapped to an RO (e.g., via parameter ssb-per-RACH-OccasionAndCB-PreamblesPerSSB or another name), the configuration assumes that the SSBs are each transmitted at different times. For instance, the first SSB in time may be mapped to a first RO (e.g. RO 0), the next SSB in time may be mapped to a second RO (e.g., RO 1), and so forth. However, if the base station transmits multiple SSBs at once, the UE may not be able to determine which RO corresponds to the SSB that the UE identified as being associated with the best beam pair (e.g., RO 0 or RO 1). Similarly, when the base station configures the number of preamble indices mapped to a single SSB (e.g., via parameter ssb-perRACH-OccasionAndCB-PreamblesPerSSB or another name), the configuration also assumes that the SSBs are each transmitted at different times. For instance, the first SSB in time may be mapped to one consecutive group of preambles (e.g. preambles 0-7), the second SSB in time may be mapped to the next consecutive group of preambles (e.g., preambles 8-15, etc.), and so forth. However, the base station does not designate specific preambles associated with different simultaneously transmitted SSBs. For example, the base station may not associate a specific group of inconsecutive preambles (e.g., preambles 1, 3, 5, 9, 17, 36 or some other designated subset of preambles) with different simultaneously transmitted SSBs.

Accordingly, aspects of the present disclosure allow a base station (or TRP) to transmit simultaneous SSBs to a UE respectively over different beams, where such SSBs do not overlap with SSBs from other base stations (or TRPs). In this way, a UE may better detect the transmission beams carrying SSBs from different cells or TRPs. Moreover, aspects of the present disclosure allow the base station to associate different ROs or designated subsets of preambles with different simultaneously transmitted SSBs. Thus, the base station may differentiate RACH preambles received from the UE in response to simultaneously transmitted SSBs, while the UE may determine the time-frequency resources in which to transmit preambles responsive to such simultaneously transmitted SSBs. Moreover, the base station may receive preambles responsive to simultaneous SSBs in separate ROs, thus providing for improved uplink reception and beamforming.

In one aspect, the base station may transmit multiple SSBs simultaneously and associate each simultaneously transmitted SSB with a different set of RACH occasions. For instance, each simultaneously transmitted SSB carried over a different transmission beam may be associated with one or more ROs specific to that SSB or transmission beam. In one example, the base station may associate ROs with simultaneous SSBs based on an SSB-specific offset (e.g., a time or frequency offset for the ROs). Such offset may be applied in lieu of, or in addition to, the aforementioned RACH parameters associating ROs with orthogonal SSBs (e.g., the parameters msg1-FDM and ssb-perRACH-OccasionAndCB-PreamblesPerSSB). In this way, the UE may determine the RO(s) in which the UE may transmit a RACH preamble (e.g., message 1 or msgA) in response to a simultaneous SSB. For instance, after identifying a simultaneous SSB associated with a best beam pair, the UE may determine an RO to transmit one of 64 randomly selected preambles based on the RO offset associated with the identified SSB.

In one example, the base station may associate simultaneous SSBs with different ROs based on a pre-configured, SSB-specific time offset for the ROs. This time offset may be in slots, subframes, symbols, or other unit of time. As an example, the network may pre-configure a time offset for ROs associated with simultaneous SSBs to be 4 slots (or some other number). In such case, the base station may map a first simultaneous SSB (e.g., having SSB index 0) to an RO beginning at slot n, a second simultaneous SSB (e.g., having SSB index 1) to an RO beginning at slot n+4, a third simultaneous SSB (e.g., having SSB index 2) to an RO beginning at slot n+8, etc. Thus, depending on whether the UE identifies the first, second, or third SSB to be associated with the best beam pair, the UE may transmit its preamble in either the RO beginning at slot n, slot n+4, or slot n+8, respectively.

Figure 7:
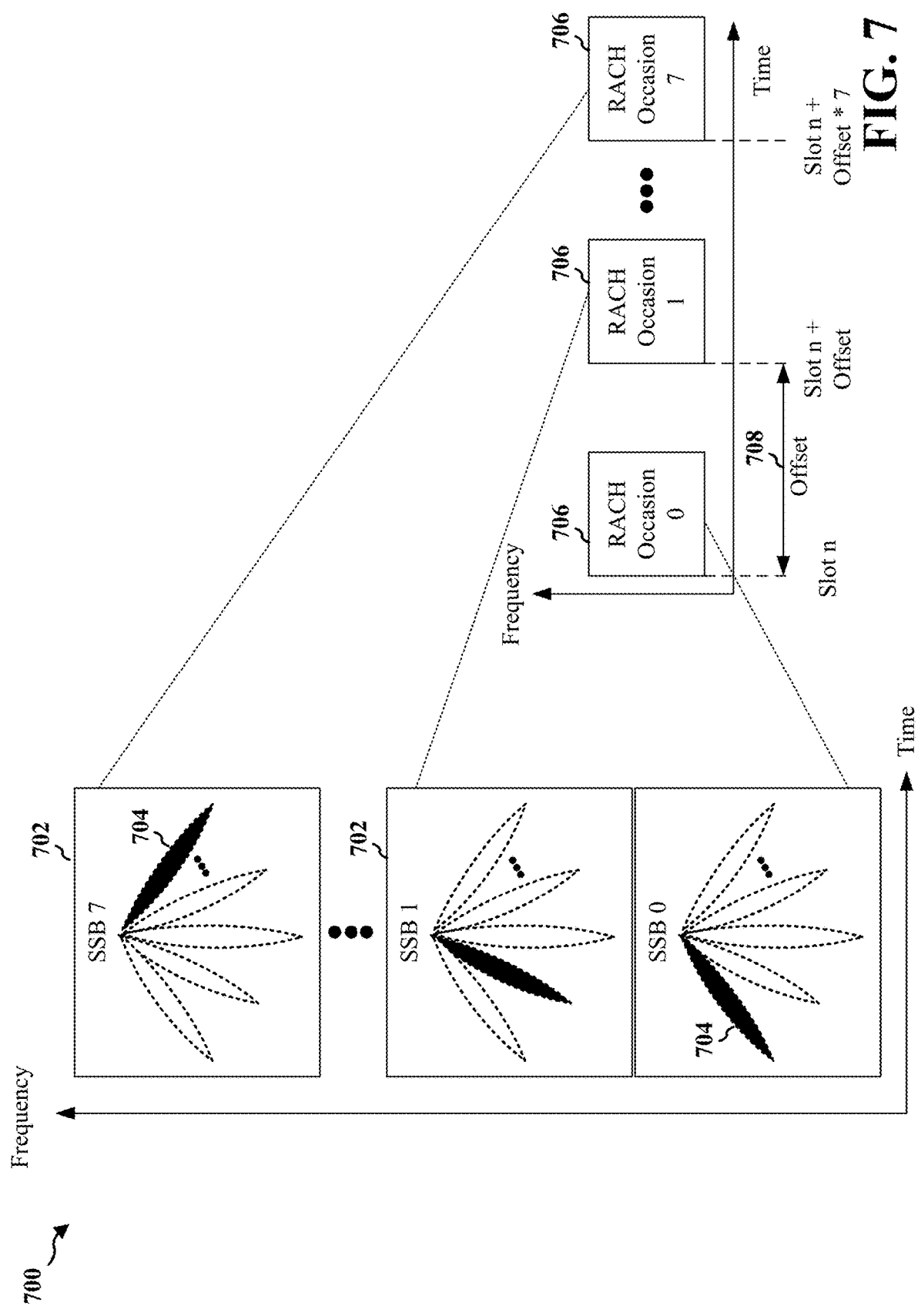
FIG. 7 is a diagram illustrating an example of simultaneously transmitted SSBs each associated with a RACH occasion.

FIG. 7 illustrates an example 700 where a base station transmits multiple SSBs 702 respectively over different transmission beams 704 at the same time, where each SSB is mapped to a RO 706 that is associated with a time offset 708. While the example of FIG. 7 illustrates the base station transmitting eight SSBs, the base station may simultaneously transmit a different number of SSBs in other examples (e.g., four SSBs, two SSBs, etc., depending on measurement capability of the UE). Here, the base station may transmit each SSB 702 in the same time resources, e.g. in the same four symbols, but over different frequency resources, e.g., in different sets of 20 RBs. Moreover, the SSBs 702 or transmission beams 704 may be mapped to the ROs 706 in increasing order of SSB index. For instance, SSB index 0 may be mapped to the RO 706 beginning at slot n, SSB index 1 may be mapped to the RO 706 beginning at slot n+offset, SSB index 2 may be mapped to the RO 706 beginning at slot n+offset*2, and so forth, until SSB index 7 which may be mapped to the RO beginning at slot n+offset*7. Alternatively, the SSBs or transmission beams may be mapped to the ROs 706 in decreasing order of SSB index, in increasing or decreasing order of frequency of each simultaneous SSB, or in other ways. Moreover, while FIG. 7 illustrates the example where one RO is associated with each SSB, in other examples multiple ROs (e.g., at different frequencies) may be associated with an SSB at a respective time. Thus, the UE may determine the RO(s) in which to transmit a preamble based on the time offset 708, as well as based on the SSB index or frequency of a simultaneously transmitted SSB.

In another example, the base station may associate simultaneous SSBs with different ROs based on a pre-configured, SSB-specific frequency offset for the ROs. This frequency offset may be in RBs, subcarriers, or other unit of frequency. As an example, the network may pre-configure a frequency offset for ROs associated with simultaneous SSBs to be 20 RBs (or some other number). In such case, the base station may map a first simultaneous SSB (e.g., having SSB index 0) to an RO beginning at RB m, a second simultaneous SSB (e.g., having SSB index 1) to an RO beginning at RB m+20, a third simultaneous SSB (e.g., having SSB index 2) to an RO beginning at RB m+40, etc. Thus, depending on whether the UE identifies the first, second, or third SSB to be associated with the best beam pair, the UE may transmit its preamble in either the RO beginning at RB m, RB m+20, or RB m+40, respectively.

Figure 8:
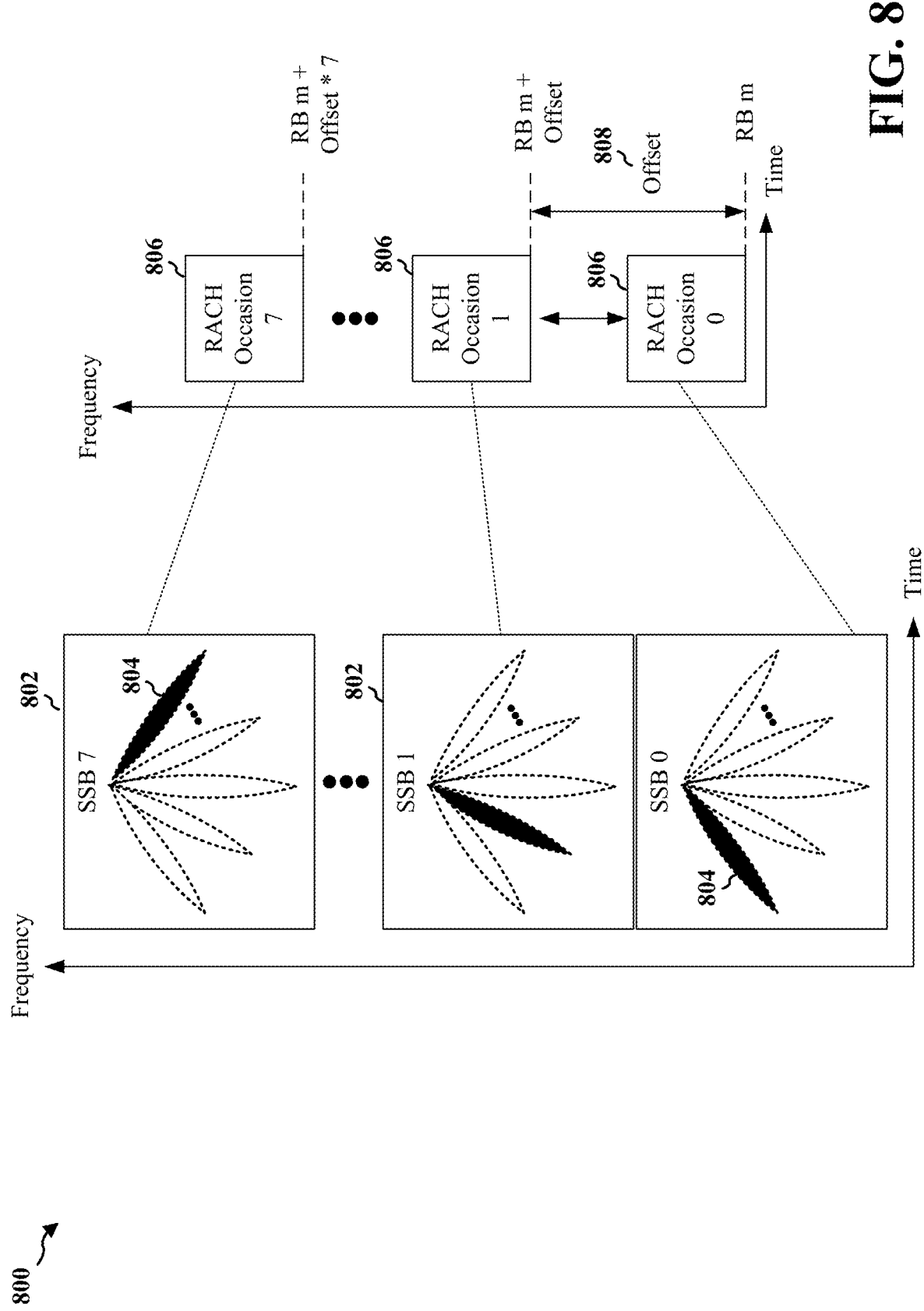
FIG. 8 is a diagram illustrating another example of simultaneously transmitted SSBs each associated with a RACH occasion.

FIG. 8 illustrates an example 800 where a base station transmits multiple SSBs 802 respectively over different transmission beams 804 at the same time, where each SSB is mapped to a RO 806 that is associated with a frequency offset 808. While the example of FIG. 8 illustrates the base station transmitting eight SSBs, the base station may simultaneously transmit a different number of SSBs in other examples (e.g., four SSBs, two SSBs, etc., depending on measurement capability of the UE). Here, the base station may transmit each SSB 802 in the same time resources, e.g. in the same four symbols, but over different frequency resources, e.g., in different sets of 20 RBs. Moreover, the SSBs 802 or transmission beams 804 may be mapped to the ROs 806 in increasing order of SSB index. For instance, SSB index 0 may be mapped to the RO 806 beginning at RB m, SSB index 1 may be mapped to the RO 806 beginning at RB m+offset, SSB index 2 may be mapped to the RO 806 beginning at RB m+offset*2, and so forth, until SSB index 7 which may be mapped to the RO beginning at RB m+offset*7. Alternatively, the SSBs or transmission beams may be mapped to the ROs 806 in decreasing order of SSB index, in increasing or decreasing order of frequency of each simultaneous SSB, or in other ways. Moreover, while FIG. 8 illustrates the example where one RO is associated with each SSB, in other examples multiple ROs (e.g., at different times) may be associated with an SSB at a respective frequency. Thus, the UE may determine the RO(s) in which to transmit a preamble based on the frequency offset 808, as well as based on the SSB index or frequency of a simultaneously transmitted SSB.

Accordingly, the base station may map ROs 706, 806 with simultaneous SSBs 702, 802 based on time offset alone (e.g., such as illustrated in the example of FIG. 7), based on frequency offset alone (e.g., such as illustrated in the example of FIG. 8), or based on both time and frequency offsets (e.g., by combining the examples of FIGS. 7 and 8). In one example, the association of ROs with simultaneous SSBs may be pre-configured by the network. In another example, the association of ROs with simultaneous SSBs may be indicated in system information. For instance, the base station may indicate the SSB-specific offset for ROs in the RMSI 414 or PBCH 406 of each SSB 402, 702, 802.

In one example, the base station may indicate the SSB-specific time or frequency offset in an SSB-specific bit field in RMSI or the PBCH of the SSB. For instance, the RMSI 414 or PBCH 406 may include one or more bits indicating a value of the time offset 708 or frequency offset 808. The UE may then determine the time-frequency resources of the ROs 706, 806 in response to the one or more bits in the RMSI or PBCH. For instance, if the base station configures the RMSI 414 or PBCH 406 with a bit value of '100' corresponding to a time offset of 4 slots, the UE may determine that RO 0 corresponding to SSB 0 is at slot n, RO 1 corresponding to SSB 1 is at slot n+4, RO 2 corresponding to SSB 2 is at slot n+8, and so forth as described above. The RMSI or PBCH may include a single field indicating the bit value for the time offset, a single field indicating the bit value for the frequency offset, or a single field for both offsets. Alternatively, the RMSI or PBCH may include a single field indicating the bit value for both the time offset and frequency offset.

Moreover, at least a portion of the content of each RMSI may be different for different SSB beams. For example, as described above, each SSB may schedule a RMSI (e.g., SIB1). For instance, the MIB of each SSB may include a CORESET 0 which includes configured time or frequency resources for a PDCCH that schedules a PDSCH carrying a respective RMSI. In such case, each RMSI may indicate a bit value for the time offset 708 corresponding to the scheduling SSB, the frequency offset 808 corresponding to the scheduling SSB, or both. That is, rather than configuring a single offset which is multiplied by different amounts to arrive at the starting time or frequencies for an RO such as illustrated in FIGS. 7 and 8, here the base station may configure a different offset which indicates the starting time or frequency for a respective RO. For example, SSB 0 may schedule a RMSI including a bit value of '000' corresponding to a time offset of 0 slots (i.e., RO 0 is at slot n), SSB 1 may schedule a RMSI including a bit value of '001' corresponding to a time offset of 4 slots (i.e., RO 1 is at slot n+4), SSB 2 may schedule a RMSI including a bit value of '010' corresponding to a time offset of 8 slots (i.e., RO 2 is at slot n+8), and so forth. The UE may thus determine the starting time or frequency for a respective RO from the different bit value of the corresponding RMSI for an identified SSB.

Alternatively, the base station may configure time or frequency offsets in RMSI or PBCH in other ways. For instance, the base station may configure bits in the RMSI 414 or PBCH 406 indicating a portion of an SSB index, where these bits also indicate the time offset 708 or frequency offset 808. As an example, the base station may explicitly include three LSBs of the SSB index in RMSI for FR2 operating frequencies, where one or more of these LSBs also indicate the value of the time or frequency offset. For instance, when configuring SSB 0 (e.g., having SSB index '000000'), the base station may indicate that the three LSBs of the SSB index '000' correspond to a time offset of 0 slots and thus that RO 0 begins at slot n, and when configuring SSB 1 (e.g., having SSB index '000001'), the base station may indicate that the three LSBs of the SSB index '001' correspond to a time offset of 4 slots and thus that RO 1 begins at slot n+4. The base station may similarly indicate time or frequency offsets in the MSBs of the SSB index in the PBCH, or the base station may indicate time or frequency offsets in other bits of the SSB index in either RMSI or PBCH.

Figure 9:
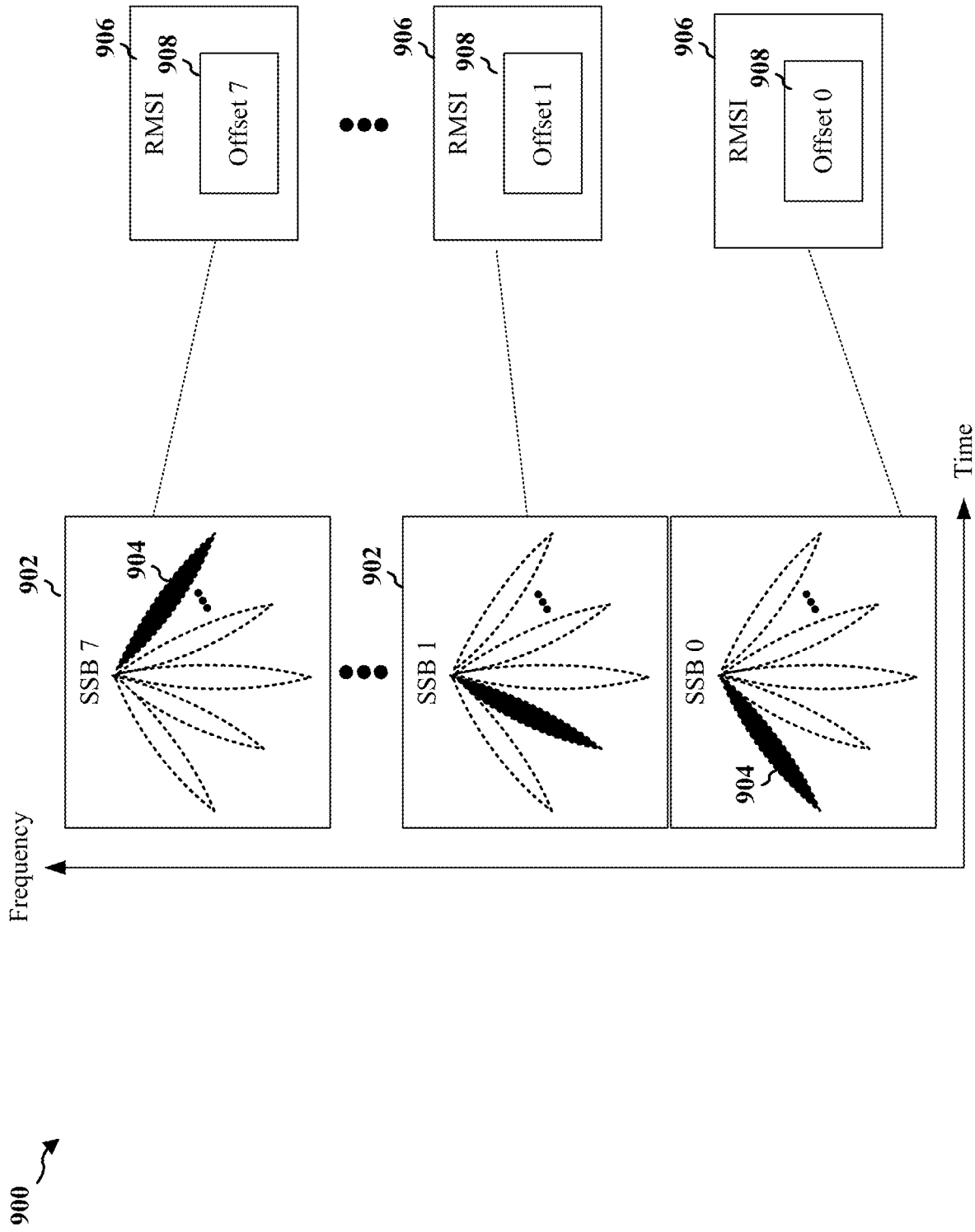
FIG. 9 is a diagram illustrating an example of simultaneously transmitted SSBs each associated with remaining minimum system information (RMSI), where each RMSI includes an offset for a different RACH occasion.

FIG. 9 illustrates an example 900 where a base station transmits multiple SSBs 902 respectively over different transmission beams 904 at the same time, where each SSB schedules RMSI 906 including an offset 908 (e.g., time offset 708 or frequency offset 808). While the example of FIG. 9 illustrates the base station transmitting eight SSBs, the base station may simultaneously transmit a different number of SSBs in other examples (e.g., four SSBs, two SSBs, etc., depending on measurement capability of the UE). Here, the base station may transmit each SSB 902 in the same time resources, e.g. in the same four symbols, but over different frequency resources, e.g., in different sets of 20 RBs. Moreover, the SSBs 902 may schedule individual RMSIs, and each RMSI 906 may include a value indicating the offset 908 corresponding to the RO (e.g., RO 706 or 806) associated with that SSB. For instance, SSB 0 may schedule a RMSI including an offset having a value of '0' (corresponding to an RO beginning at slot n or RB m), SSB 1 may schedule a RMSI including an offset having a value of '1' (corresponding to an RO beginning at slot n+offset or RB m+offset), SSB 2 may schedule a RMSI including an offset having a value of '2' (corresponding to an RO beginning at slot n+offset*2 or RB m+offset*2), and so forth, until SSB 7 which may schedule a RMSI including an offset having a value of '7' (corresponding to an RO beginning at slot n+offset*7 or RB m+offset*7). While FIG. 9 illustrates the example where each RMSI includes the offset 908, in other examples, the PBCH of each SSB may include the offset 908 (e.g., SSB 0 may include offset 0, SSB 1 may include offset 1, etc.). Moreover, rather than configuring a separate field for each offset in the RMSI (or PBCH) as illustrated in the example of FIG. 9, in other examples, the base station may configure offsets through one or more bits of the SSB index such as described above. Thus, the UE may determine the time or frequency offsets corresponding to the RO(s) based on RMSI or PBCH, either explicitly from dedicated offset fields in the RMSI or PBCH, or implicitly from bits of the SSB index in the RMSI or PBCH.

Additionally, the base station may associate ROs with simultaneous SSBs, e.g., based on pre-configured or indicated SSB-specific offsets, in specific frequency ranges or subcarrier spacings. For example, the base station may simultaneously transmit SSBs 702, 802, 902, and accordingly map each SSB to one or more ROs 706, 806 based on an SSB-specific time offset 708 or frequency offset 808, in response to determining that the operating frequency range 410 (see FIG. 4) is FR2 or above or that the subcarrier spacing 412 (see FIG. 4) is 120 kHz or above. In this way, the base station may associate ROs with simultaneous SSBs in situations where the lack of scalability of orthogonal SSBs in multi-cell environments is most significant (e.g., where larger numbers of candidate SSBs are provided by multiple base stations or TRPs).

In another aspect, the base station may transmit multiple SSBs simultaneously and associate each simultaneously transmitted SSB with a designated subset of preamble sequences. For instance, each simultaneously transmitted SSB carried over a different transmission beam may be associated with a subset of preambles for message 1 or msgA that are specific to that SSB or transmission beam. For example, assuming a configured set of 64 RACH preambles (e.g., preambles 0-63), the base station may associate one simultaneous SSB with one subset of preambles 0, 8, 16, 24, 32, 40, 48, 56, another simultaneous SSB with another subset of preambles 1, 9, 17, 25, 33, 41, 49, 57, and so forth, and the UE may randomly select one of these preambles for message 1 or msgA from the subset associated with the SSB identified for the best beam pair. The designation of preamble subsets for simultaneous SSBs may be applied in lieu of, or in addition to, the aforementioned RACH parameter associating preambles with orthogonal SSBs (e.g., the parameter ssb-perRACH-OccasionAndCB-Preambles-PerSSB). In this way, the UE and base station may differentiate simultaneous SSBs based on designated subsets of preambles, and the UE may determine which preamble to select for message 1 or msgA in response to a simultaneous SSB. For instance, after identifying a simultaneous SSB associated with a best beam pair, the UE may determine to transmit a randomly selected preamble in an RO from a subset of designated preambles associated with the identified SSB.

Figure 10:
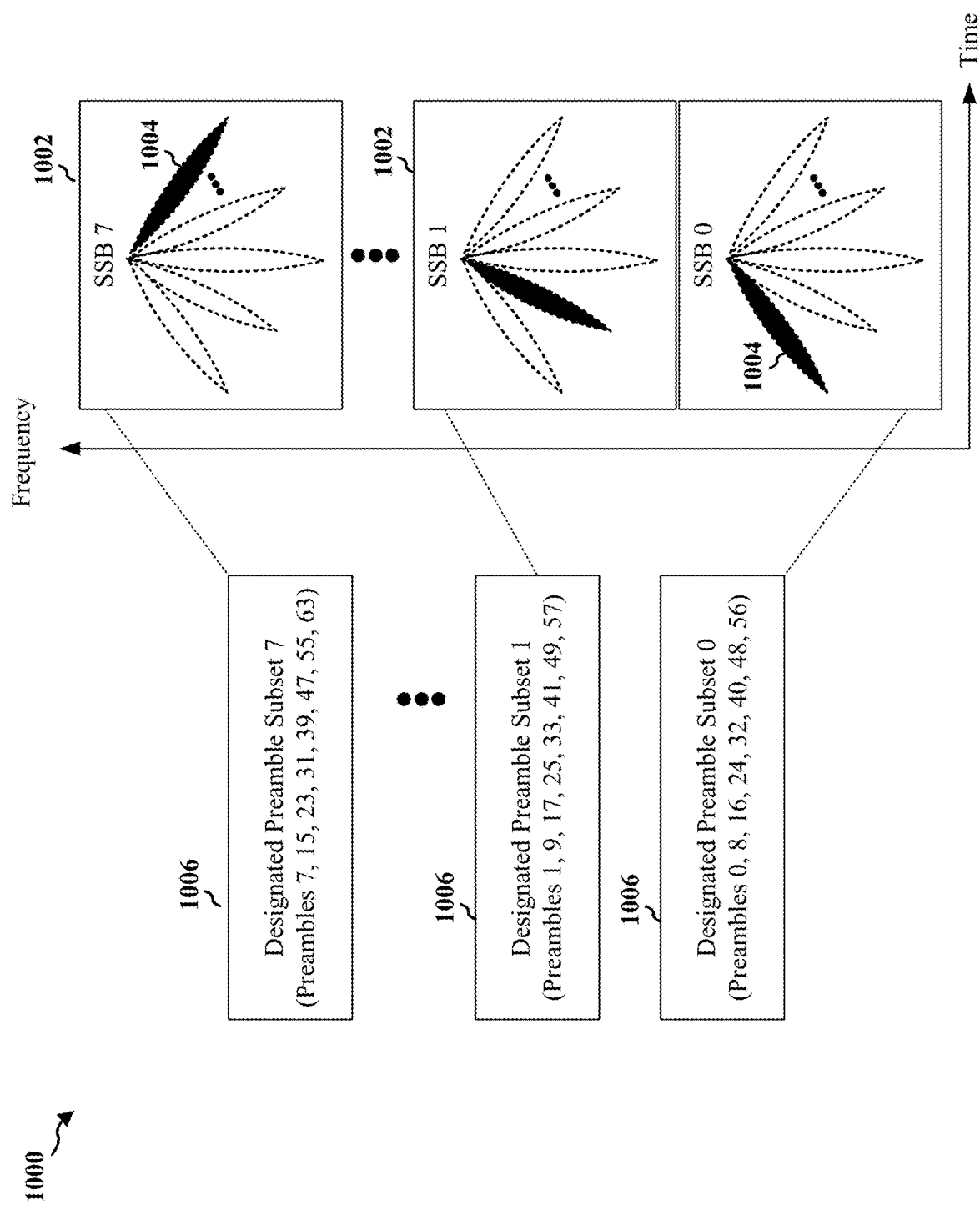
FIG. 10 is a diagram illustrating an example of simultaneously transmitted SSBs each associated with a designated subset of RACH preambles.

FIG. 10 illustrates an example 1000 where a base station transmits multiple SSBs 1002 respectively over different transmission beams 1004 at the same time, where each SSB is mapped to a designated preamble subset 1006. In this example, the base station has configured different combinations of eight, inconsecutive preambles for the designated preamble subsets 1006, although other numbers or combinations of inconsecutive or consecutive preambles may be configured in other examples. Moreover, while the example of FIG. 10 illustrates the base station transmitting eight SSBs, the base station may simultaneously transmit a different number of SSBs in other examples (e.g., four SSBs, two SSBs, etc., depending on measurement capability of the UE). Here, the base station may transmit each SSB 1002 in the same time resources, e.g. in the same four symbols, but over different frequency resources, e.g., in different sets of 20 RBs. Furthermore, the SSBs 1002 or transmission beams 1004 may be mapped to the designated preamble subsets 1006 in increasing order of SSB index. For instance, SSB index 0 may be mapped to designated preamble subset 0 (e.g., preambles 0, 8, 16, 24, 32, 40, 48, 56), SSB index 1 may be mapped to designated preamble subset 1 (e.g., preambles 1, 9, 17, 25, 33, 41, 49, 57), and so forth, until SSB index 7 which may be mapped to designated preamble subset 7 (e.g., preambles 7, 15, 23, 31, 39, 47, 55, 63). Alternatively, the SSBs or transmission beams may be mapped to the designated preamble subsets in decreasing order of SSB index, in increasing or decreasing order of frequency of each simultaneous SSB, or in other ways. Thus, the UE may determine a preamble based on the designated preamble subsets 1006, as well as based on the SSB index or frequency of a simultaneously transmitted SSB.

In another example, the base station may associate simultaneous SSBs with designated subsets of RACH preambles based on a SSB-specific shift in the indices of the preamble sequences. For example, the base station may associate each simultaneous SSB with a common subset of preambles (e.g., preambles 0, 8, 16, 24, 32, 40, 48, 56, or some other combination of inconsecutive or consecutive preambles), and the UE may apply a pre-configured, SSB-specific cyclic shift to each of the preambles to identify a designated preamble subset for each SSB. For instance, the UE may perform a different, pre-configured number of cyclic shifts (depending on the SSB) to each preamble in the common subset to obtain a different designated preamble subset for each SSB. As an example, a first simultaneous SSB (e.g., having SSB index 0) may be pre-configured with one number of cyclic shifts (e.g., 1), a second simultaneous SSB (e.g, having SSB index 1) may be pre-configured with another number of cyclic shifts (e.g., 2), a third simultaneous SSB (e.g., having SSB index 2) may be pre-configured with a further number of cyclic shifts (e.g., 3), and so forth. Thus, for the first SSB the UE may apply one cyclic shift to each preamble in the common subset to identify preambles 1, 9, 17, 25, 33, 41, 49, 57 as the designated preamble subset for that SSB, for the second SSB the UE may apply two cyclic shifts to each preamble in the common subset to identify preambles 2, 10, 18, 26, 34, 42, 50, 58 as the designated preamble subset for that SSB, for the third SSB the UE may apply three cyclic shifts to each preamble in the common subset to identify preambles 3, 11, 19, 27, 35, 43, 51, 59 as the designated preamble subset for that SSB, and so forth. Alternatively, rather than mapping a different number of cyclic shifts to each individual SSB, the same number of cyclic shifts may be mapped to multiple SSBs. For example, the first and second SSB may each be associated with one cyclic shift, the third and fourth SSB may each be associated with two cyclic shifts, the fifth and sixth SSB may each be associated with three cyclic shifts, etc. Thus, depending on which SSB the UE identifies to be associated with the best beam pair, the UE may transmit one of the preambles selected from the aforementioned designated preamble subsets based on the number of cyclic shifts respectively mapped to that SSB.

Figure 11:
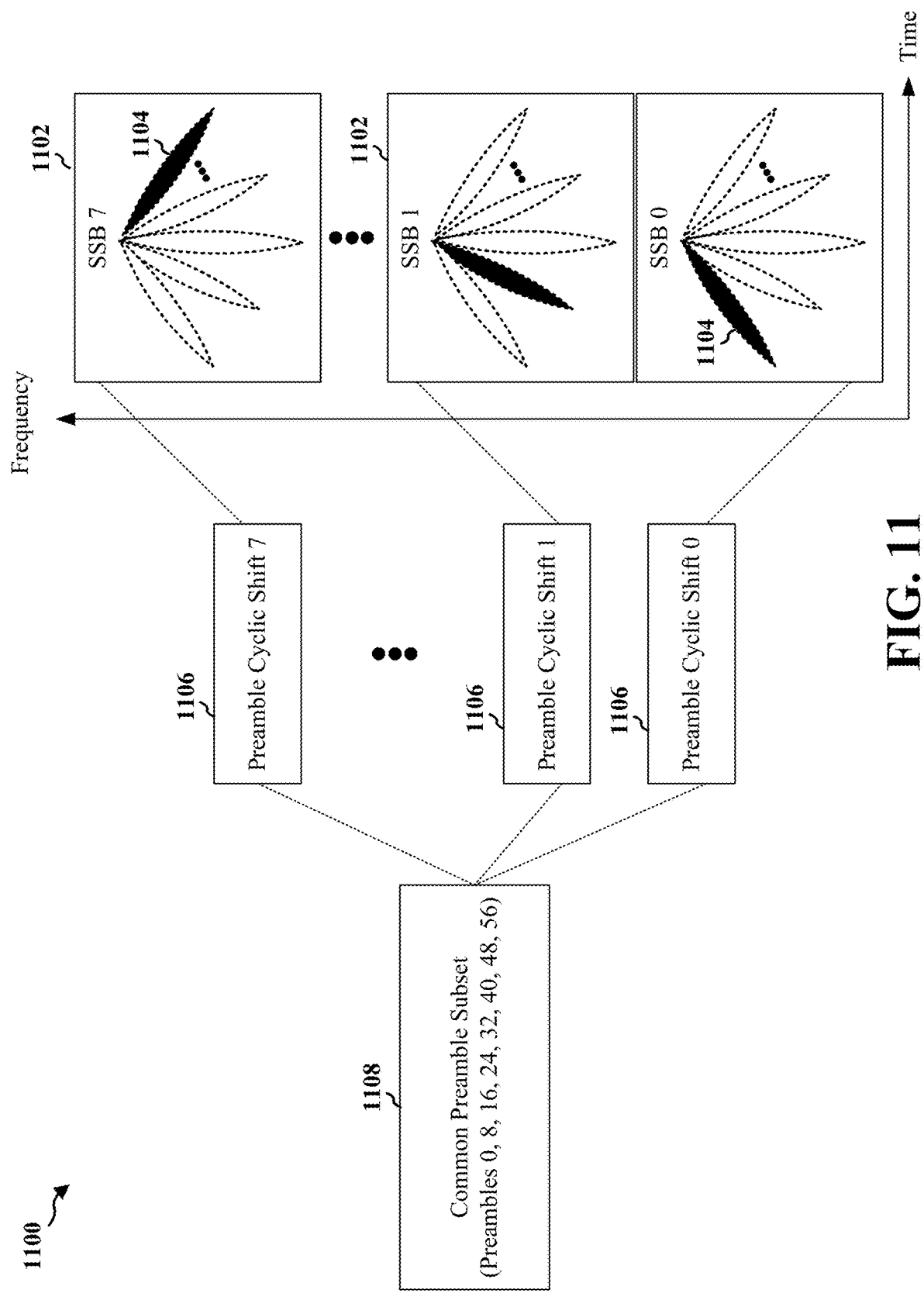
FIG. 11 is a diagram illustrating an example of simultaneously transmitted SSBs each associated with a number of cyclic shifts to be applied to a common subset of RACH preambles.

FIG. 11 illustrates an example 1100 where a base station transmits multiple SSBs 1102 respectively over different transmission beams 1104 at the same time, where each SSB is mapped to a different number of preamble cyclic shifts 1106 for a common preamble subset 1108. In this example, the base station has configured a specific combination of eight, inconsecutive preambles for the common preamble subset 1108, although other numbers or combinations of inconsecutive or consecutive preambles may be configured in other examples. Furthermore, in this example, the base station has configured each SSB 1102 with a different number of preamble cyclic shifts 1106, although in other examples, the base station may configure multiple SSBs with the same number of preamble cyclic shifts 1106. Moreover, while the example of FIG. 11 illustrates the base station transmitting eight SSBs, the base station may simultaneously transmit a different number of SSBs in other examples (e.g., four SSBs, two SSBs, etc., depending on measurement capability of the UE). Here, the base station may transmit each SSB 1102 in the same time resources, e.g. in the same four symbols, but over different frequency resources, e.g., in different sets of 20 RBs. Furthermore, the SSBs 1102 or transmission beams 1104 may be mapped to the corresponding numbers of preamble cyclic shifts 1106 in increasing order of SSB index. For instance, SSB index 0 may be mapped to zero cyclic shifts (e.g., resulting in preambles 0, 8, 16, 24, 32, 40, 48, 56), SSB index 1 may be mapped to one cyclic shift (e.g., resulting in preambles 1, 9, 17, 25, 33, 41, 49, 57), and so forth, until SSB index 7 which may be mapped to seven cyclic shifts (e.g., resulting in preambles 7, 15, 23, 31, 39, 47, 55, 63). Alternatively, the SSBs or transmission beams may be mapped to the numbers of preamble cyclic shifts 1106 in decreasing order of SSB index, in increasing or decreasing order of frequency of each simultaneous SSB, or in other ways. Thus, the UE may determine a designated preamble subset for each SSB based on the common preamble subset 1108 and the number of preamble cyclic shifts 1106 associated with each SSB, as well as based on the SSB index or frequency of a simultaneously transmitted SSB.

Accordingly, the base station may map designated preamble subsets 1006 or numbers of preamble cyclic shifts 1106 with simultaneous SSBs 1002, 1102. The designated preamble subsets may be different for each SSB without cyclic shifting a common preamble subset (e.g., as described above with respect to FIG. 10), or the designated preamble subsets may be different for each SSB in response to cyclic shifting a common preamble subset (e.g., as described above with respect to FIG. 11). Alternatively, the designated preamble subsets may be different for some SSBs but may be the same (e.g., common) for other SSBs, or the number of cyclic shifts may be different for some SSBs but may be the same for other SSBs. Thus, a combination of the approaches described above with respect to FIGS. 10 and 11 may be applied for different SSBs. In one example, the association of designated preamble subsets or preamble cyclic shifts with simultaneous SSBs may be pre-configured by the network. In another example, the association of designated preamble subsets of preamble cyclic shifts with simultaneous SSBs may be indicated in system information. For instance, the base station may indicate designated preamble sequences or SSB-specific shifts in the RMSI 414 or PBCH 406 of each SSB 402, 1002, 1102.

In one example, the base station may indicate the SSB-specific subsets of preamble sequences (e.g., the designated preamble subsets 1006) or the SSB-specific shifts (e.g., the number of preamble cyclic shifts 1106) in an SSB-specific bit field in RMSI or the PBCH of the SSB. Moreover, at least a portion of the content of each RMSI may be different for different SSB beams. For example, as described above, each SSB may schedule a RMSI (e.g., SIB1). For instance, the MIB of each SSB may include a CORESET 0 which includes configured time or frequency resources for a PDCCH that schedules a PDSCH carrying a respective RMSI. In such case, each RMSI 414 (or PBCH 406) may include one or more bits indicating the designated preamble subset 1006 associated with the SSB, or indicating the number of preamble cyclic shifts 1106 associated with the SSB. The UE may accordingly determine the preamble to transmit in an RO in response to the one or more bits in the RMSI or PBCH. For example, if the base station configures the RMSI 414 scheduled by an SSB (or the PBCH 406 of that SSB) with a designated preamble subset bit value of '001' (e.g., corresponding to designated preamble subset 1 in FIG. 10), the UE may determine that the SSB scheduling that RMSI or including that PBCH is associated with preambles 1, 9, 17, 25, 33, 41, 49, and 57 as described above. Additionally or alternatively, if the base station configures the RMSI 414 (or PBCH 406) with a cyclic shift bit value of '111' (e.g., corresponding to preamble cyclic shift 7 in FIG. 11), the UE may determine, after performing seven cyclic shifts of each preamble in common preamble subset 0, 8, 16, 24, 32, 40, 48, 56, that the SSB scheduling that RMSI or including that PBCH is associated with preambles 7, 15, 23, 31, 39, 47, 55, 63. The RMSI or PBCH may also include one or more bits indicating a common preamble subset associated with a corresponding SSB. The RMSI or PBCH may include a single field indicating the bit value for a designated preamble subset, a single field indicating the bit value for a number of cyclic shifts, a single field indicating the bit value of a common preamble subset, or a combination of any of these fields. Alternatively, the RMSI or PBCH may include one or more fields indicating a combination of any of these parameters (e.g., in the same field(s)).

Figure 12:
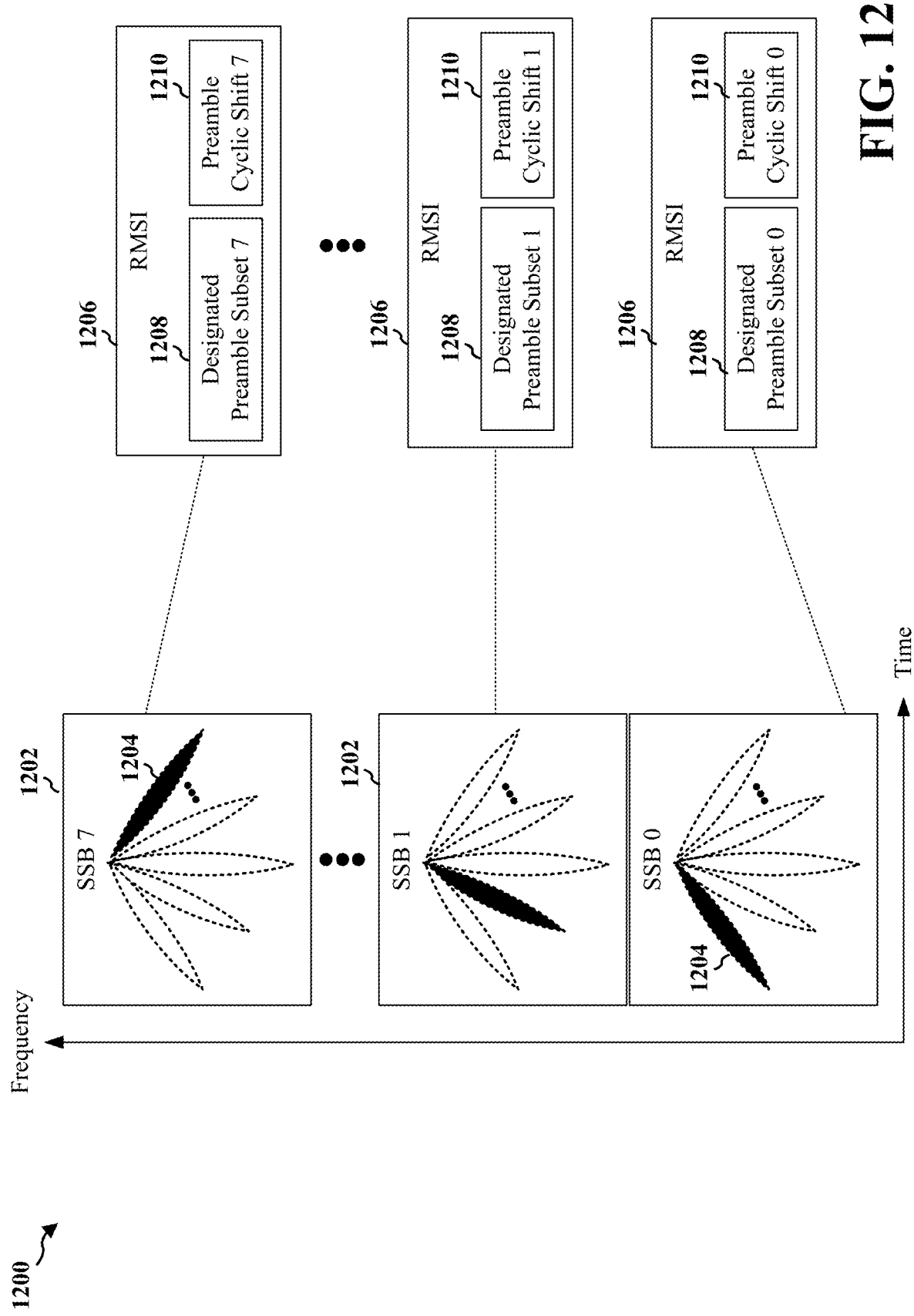
FIG. 12 is a diagram illustrating an example of simultaneously transmitted SSBs each associated with RMSI, where each RMSI includes a different designated preamble subset or number of preamble cyclic shifts.

FIG. 12 illustrates an example 1200 where a base station transmits multiple SSBs 1202 respectively over different transmission beams 1204 at the same time, where each SSB schedules RMSI 1206 including a designated preamble subset 1208 (e.g., designated preamble subset 1006) and a number of preamble cyclic shifts 1210 (e.g., number of preamble cyclic shifts 1106). While the example of FIG. 12 illustrates the base station transmitting eight SSBs, the base station may simultaneously transmit a different number of SSBs in other examples (e.g., four SSBs, two SSBs, etc., depending on measurement capability of the UE). Here, the base station may transmit each SSB 1202 in the same time resources, e.g. in the same four symbols, but over different frequency resources, e.g., in different sets of 20 RBs. Moreover, the SSBs 1202 may schedule individual RMSIs, and each RMSI 1206 may include a value indicating the designated preamble subset 1208 or the number of preamble cyclic shifts 1210 associated with that SSB. For instance, SSB 0 may schedule a RMSI indicating designated preamble subset 0 of FIG. 10 or preamble cyclic shift of FIG. 11 (e.g., preambles 0, 8, 16, 24, 32, 40, 48, 56), SSB 1 may schedule a RMSI indicating designated preamble subset 1 of FIG. 10 or preamble cyclic shift 1 of FIG. 11 (e.g., preambles 1, 9, 17, 25, 33, 41, 49, 57), and so forth. While FIG. 12 illustrates the example where each RMSI includes the designated preamble subset 1208 or the number of preamble cyclic shifts 1210, in other examples, the PBCH of each SSB may include the designated preamble subset 1208 or the number of preamble cyclic shifts 1210 (e.g., SSB 0 may include designated preamble subset 0 or preamble cyclic shift 0, SSB 1 may include designated preamble subset 1 or preamble cyclic shift 1, etc.). Moreover, rather than configuring a separate field for each preamble subset or number of cyclic shifts in the RMSI (or PBCH) as illustrated in the example of FIG. 12, in other examples, the base station may combine these fields. The base station may also indicate a common preamble subset for multiple SSBs in each RMSI (or PBCH), from which the UE may determine the designated preamble subset for one of the SSBs 1202 based on the number of cyclic shifts 1210 indicated in RMSI (or PBCH) for that SSB as described above. Thus, the UE may determine a preamble to transmit in an RO associated with an SSB based on RMSI or PBCH, either from the dedicated preamble subset 1208, the number of preamble cyclic shifts 1210, a common preamble subset, or from any combination of these parameters.

Accordingly in this example, after receiving simultaneous SSBs and identifying the SSB associated with the best beam pair, the UE may randomly select a preamble based on the designated preamble subset 1006, 1208 or based on the number of cyclic shifts 1106, 1210 and the common preamble subset 1108. The UE may then transmit the preamble over a transmission beam corresponding to the identified SSB (e.g., matching the direction of the reception beam identified in the best beam pair). However, unlike the previous examples of FIGS. 7-9 where different ROs are associated with different SSBs, here the UE may transmit the preamble in a common RO associated with all of the SSBs 1002, 1102, 1202. Nevertheless, as each preamble is from a subset associated with a different simultaneous SSB, and as the base station may receive different preambles associated with different simultaneous SSBs on the same set of RACH occasions and over the same RF chain, the base station may differentiate the UE's identified SSB from other simultaneous SSBs.

Additionally, the base station may associate preamble subsets with simultaneous SSBs, e.g., based on pre-configured or indicated SSB-specific subsets of preamble sequences or cyclic shifts, in specific frequency ranges or SCS. For example, the base station may simultaneously transmit SSBs 1002, 1102, 1202, and accordingly map each SSB to designated preamble subsets 1006, 1208 or numbers of cyclic shifts 1106, 1210 in response to determining that the operating frequency range 410 (see FIG. 4) is FR2 or above or that the subcarrier spacing 412 (see FIG. 4) is 120 kHz or above. In this way, the base station may associate preamble subsets with simultaneous SSBs in situations where the lack of scalability of orthogonal SSBs in multi-cell environments is most significant (e.g., where larger numbers of candidate SSBs are provided by multiple base stations or TRPs).

Figure 13:
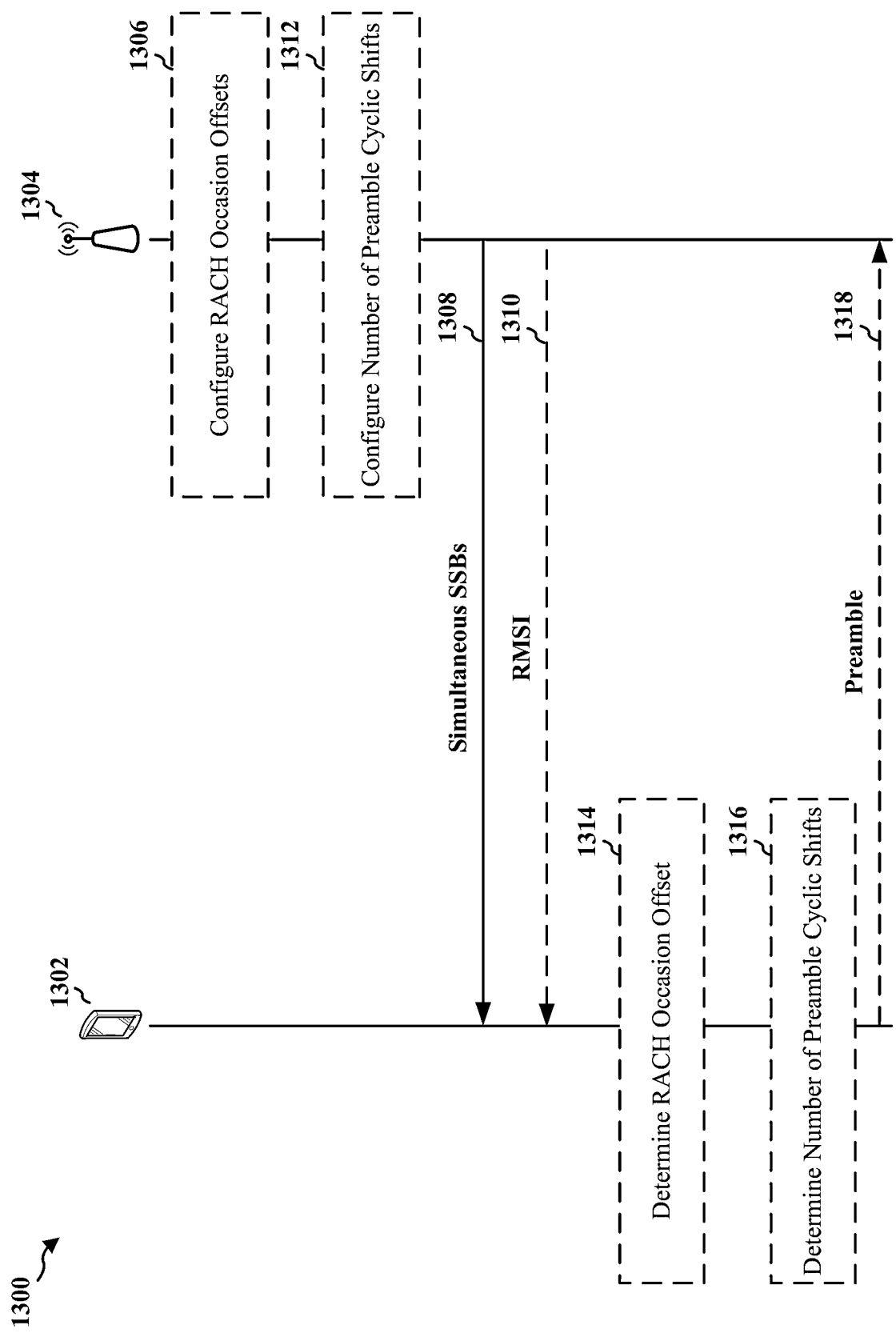
FIG. 13 is a call flow diagram between a UE and a base station.

FIG. 13 is an example 1300 of a call flow between a UE 1302 and a base station 1304. At 1306, the base station may configure RO offsets for simultaneous SSBs 1308. For instance, referring to FIGS. 7-9, the base station may configure offset 908 (e.g., time offset 708 of frequency offset 808) for ROs 706, 806 corresponding to each SSB 702, 802. The base station may include the configured offset in RMSI 1310 (e.g., RMSI 414, 906) or in the simultaneous SSBs 1308 (e.g., in PBCH 406). Similarly, at 1312, the base station may configure a number of preamble cyclic shifts for the simultaneous SSBs 1308. For instance, referring to FIGS. 10-12, the base station may configure the number of preamble cyclic shifts 1210 (e.g., number of preamble cyclic shifts 1106) for each SSB 1002, 1102, 1202. The base station may include the configured number in RMSI 1310 (e.g., RMSI 414, 906) or in the simultaneous SSBs 1308 (e.g., in PBCH 406).

The base station 1304 then sends the simultaneous SSBs 1308 to the UE 1302. For example, referring to FIGS. 3 and 7-12, controller/processor 375 of base station 310 may modulate data in SSBs 702, 802, 902, 1002, 1102, 1202 (e.g., the PSS 404, SSS 408, and payload in PBCH 406), and TX processor 316 of base station 310 may transmit the modulated data to UE 350 simultaneously using antennas 320. For instance, each SSB may be transmitted at the same time using a different antenna to UE 350. The UE 1302 similarly obtains the simultaneous SSBs 1308 from the base station 1304. For example, referring to FIGS. 3 and 7-12, RX processor 356 of UE 310 may receive modulated data in SSBs 702, 802, 902, 1002, 1102, 1202 from base station 310 using antennas 352 (e.g., each SSB may be received at the same time using a different antenna), and controller/processor 359 of UE 310 may demodulate the received data to obtain the SSBs (e.g., the PSS 404, SSS 408, and payload in PBCH 406). Similarly, the base station 1304 may send the RMSI 1310 scheduled by each of the simultaneous SSBs 1308 to the UE 1302, and the UE 1302 may similarly obtain the RMSI 1310 scheduled by each of the simultaneous SSBs 1308.

At 1314, the UE determines an RO offset for one of the simultaneous SSBs 1308. For instance, referring to FIGS. 7-9, the UE may determine offset 908 (e.g., time offset 708 of frequency offset 808) corresponding to the RO 706, 806 for the SSBs 702, 802 associated with a best beam pair. The UE may determine the offset, for example, from RMSI 1310 (e.g., RMSI 414, 906) or from the SSB (e.g., in PBCH 406). Similarly, at 1316, the UE may determine a number of preamble cyclic shifts for one of the simultaneous SSBs 1308. For instance, referring to FIGS. 10-12, the UE may determine the number of preamble cyclic shifts 1210 (e.g., number of preamble cyclic shifts 1106) for the SSB 1002, 1102, 1202 associated with a best beam pair. The UE may determine the configured number of cyclic shifts, for example, from RMSI 1310 (e.g., RMSI 414, 906) or from the SSB (e.g., in PBCH 406). Afterwards, the UE 1302 may randomly select and transmit a preamble 1318 to the base station 1304 in a RO associated with the SSB.

Figure 14:
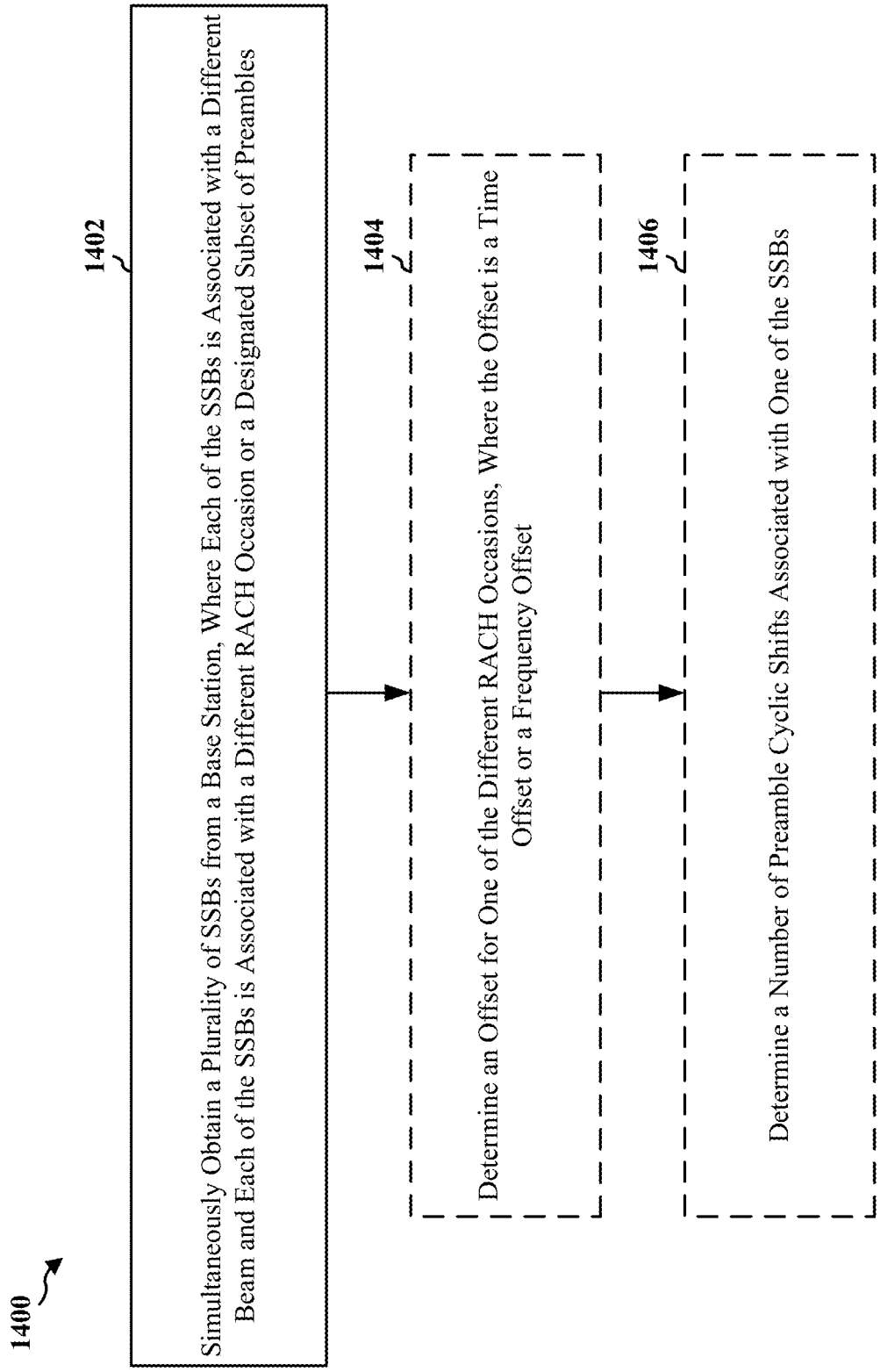
FIG. 14 is a flowchart of a method of wireless communication at a UE.

FIG. 14 is a flowchart 1400 of a method of wireless communication. The method may be performed by a UE (e.g., the UE 104, 350, 602, 1302; the apparatus 1602). Optional aspects are illustrated in dashed lines. The method allows a UE to receive simultaneous SSBs from a base station respectively over different beams, where the SSBs are associated with different ROs or designated subsets of preambles. As a result, the UE may determine the RACH preamble, and the time-frequency resources in which to transmit the preamble, in response to a simultaneously transmitted SSB.

At 1402, the UE simultaneously obtains a plurality of SSBs from a base station, where each of the SSBs is associated with a different beam; and where each of the SSBs is associated with a different RACH occasion or a designated subset of preambles. For example, 1402 may be performed by SSB component 1640. For instance, referring to FIGS. 6-13, the UE 602, 1302 may obtain from base station 604, 1304 simultaneous SSBs 1308 (e.g., SSBs 702, 802, 902, 1002, 1102, 1202) over different transmission beams (e.g. transmission beams 608, 704, 804, 904, 1004, 1104, 1204), respectively. Each of the simultaneous SSBs may be associated with a different RO (e.g., RO 706, 806), such as described above with respect to FIGS. 7-9. Alternatively or additionally, each of the SSBs may be associated with a designated subset of preambles (e.g., designated preamble subset 1006, 1208 or common preamble subset 1108), such as described above with respect to FIGS. 10-12.

In one aspect, each of the SSBs may be associated with a different one of the different RACH occasions. For example, as described above with respect to FIGS. 7-9, each of the simultaneous SSBs 1308 (e.g., SSBs 702, 802, 902) may be associated with a different RO (e.g., ROs 706, 806). In such case, at 1404, the UE may determine an offset for one of the different RACH occasions, where the offset is a time offset or a frequency offset. For example, 1404 may be performed by offset component 1642. For instance, referring to FIGS. 7, 8 and 13, at 1314, the UE may determine an RO offset (e.g., time offset 708 or frequency offset 808) for one of the ROs 706, 806 associated with one of the SSBs 702, 802. In one example, the offset may be in RMSI or in a PBCH. For instance, referring to FIGS. 4 and 9, the offset 908 may be in RMSI 414, 906 or in PBCH 406. In one example, each of the SSBs may schedule RMSI, and each of the RMSI includes a different offset. For instance, referring to FIG. 9, each of the SSBs 902 may schedule RMSI 906, and each of the RMSI may include offset 908.

In another aspect, each of the SSBs may be associated with one of the designated subsets of preambles. For example, as described above with respect to FIGS. 10-12, each of the simultaneous SSBs 1308 (e.g., SSBs 1002, 1102, 1202) may be associated with designated preamble subset 1006, 1208 or common preamble subset 1108. In one example, the designated subset of preambles may be different for each of the SSBs. For instance, referring to FIG. 10, designated preamble subsets 1006 may be different for each SSB 1002 (e.g., designated preamble subset 0, 1, etc.) In another example, at 1406, the UE may determine a number of preamble cyclic shifts associated with one of the SSBs. For example, 1406 may be performed by preamble cyclic shift component 1644. For instance, referring to FIGS. 11 and 13, at 1316, the UE 1302 may determine a number of preamble cyclic shifts (e.g., number of preamble cyclic shifts 1106) associated with one of the SSBs 1102. In one example, the designated subset of preambles associated with the one of the SSBs or the number of preamble cyclic shifts may be in RMSI. For instance, referring to FIGS. 4 and 12, the designated preamble subsets 1208 or number of preamble cyclic shifts 1210 may be in RMSI 414, 1206. In another example, each of the SSBs may schedule RMSI, and each of the RMSI may include a different one of the designated subset of preambles or a different number of preamble cyclic shifts. For instance, referring to FIG. 12, each of the SSBs 1202 may schedule RMSI 1206, and each of the RMSI may include designated preamble subset 1208 or number of preamble cyclic shifts 1210.

In either aspect, the SSBs may be obtained simultaneously in response to an operating frequency range or a subcarrier spacing. For instance, referring to FIGS. 4 and 7-13, the UE 1302 may obtain simultaneous SSBs 1308 (e.g., SSBs 702, 802, 902, 1002, 1102, 1202) in a certain operating frequency range (e.g., operating frequency range 410) or SCS (e.g., SCS 412). In one example, the SSBs may be obtained simultaneously in response to the subcarrier spacing being at least 120 kHz (or the operating frequency range being FR2 or beyond).

Figure 15:
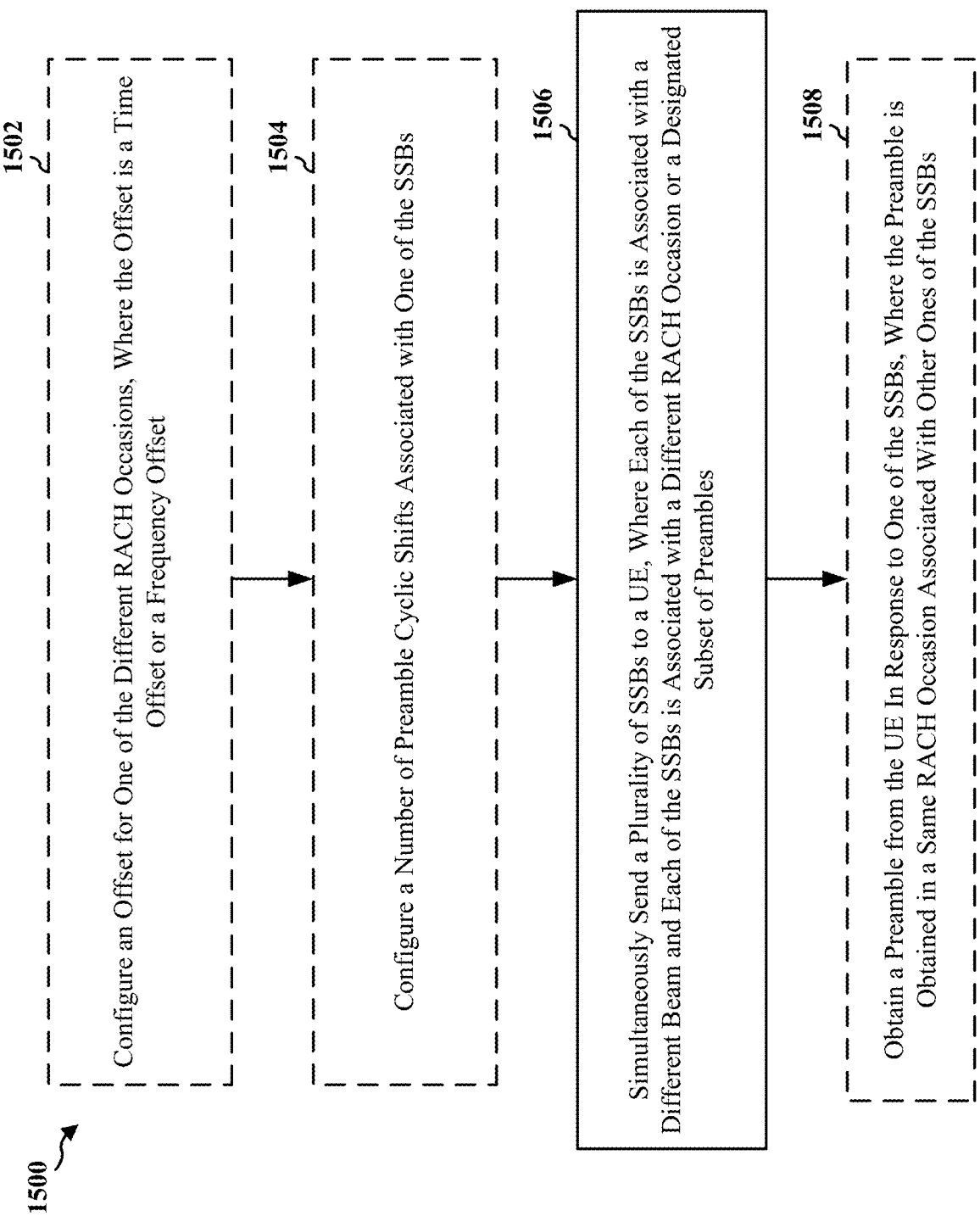
FIG. 15 is a flowchart of a method of wireless communication at a base station.

FIG. 15 is a flowchart 1500 of a method of wireless communication. The method may be performed by a base station (e.g., the base station 102/180, 310, 604, 1304; the apparatus 1702). Optional aspects are illustrated in dashed lines. The method allows a base station to transmit simultaneous SSBs to a UE respectively over different beams, where the SSBs are associated with different ROs or designated subsets of preambles. As a result, the base station may differentiate RACH preambles received from the UE in response to simultaneously transmitted SSBs.

At 1506, the base station simultaneously sends a plurality of SSBs to a UE, where each of the SSBs is associated with a different beam; and where each of the SSBs is associated with a different RACH occasion or a designated subset of preambles. For example, 1506 may be performed by SSB component 1740. For instance, referring to FIGS. 6-13, the base station 604, 1304 may send to UE 602, 1302 simultaneous SSBs 1308 (e.g., SSBs 702, 802, 902, 1002, 1102, 1202) over different transmission beams (e.g. transmission beams 608, 704, 804, 904, 1004, 1104, 1204), respectively. Each of the simultaneous SSBs may be associated with a different RO (e.g., RO 706, 806), such as described above with respect to FIGS. 7-9. Alternatively or additionally, each of the SSBs may be associated with a designated subset of preambles (e.g., designated preamble subset 1006, 1208 or common preamble subset 1108), such as described above with respect to FIGS. 10-12.

In one aspect, each of the SSBs may be associated with a different one of the different RACH occasions. For example, as described above with respect to FIGS. 7-9, each of the simultaneous SSBs 1308 (e.g., SSBs 702, 802, 902) may be associated with a different RO (e.g., ROs 706, 806). In such case, at 1502, the base station may configure an offset for one of the different RACH occasions, where the offset is a time offset or a frequency offset. For example, 1502 may be performed by offset component 1742. For instance, referring to FIGS. 7, 8 and 13, at 1306, the base station may configure an RO offset (e.g., time offset 708 or frequency offset 808) for each of the ROs 706, 806 associated with each of the SSBs 702, 802. In one example, the offset may be configured in RMSI or in a PBCH. For instance, referring to FIGS. 4 and 9, the offset 908 may be in RMSI 414, 906 or in PBCH 406. In one example, each of the SSBs may schedule RMSI, and each of the RMSI includes a different offset. For instance, referring to FIG. 9, each of the SSBs 902 may schedule RMSI 906, and each of the RMSI may include offset 908.

In another aspect, each of the SSBs may be associated with one of the designated subsets of preambles. For example, as described above with respect to FIGS. 10-12, each of the simultaneous SSBs 1308 (e.g., SSBs 1002, 1102, 1202) may be associated with designated preamble subset 1006, 1208 or common preamble subset 1108. In one example, the designated subset of preambles may be different for each of the SSBs. For instance, referring to FIG. 10, designated preamble subsets 1006 may be different for each SSB 1002 (e.g., designated preamble subset 0, 1, etc.) In another example, at 1504, the base station may configure a number of preamble cyclic shifts associated with one of the SSBs. For example, 1504 may be performed by preamble cyclic shift component 1744. For instance, referring to FIGS. 11 and 13, at 1312, the base station 1304 may configure a number of preamble cyclic shifts (e.g., number of preamble cyclic shifts 1106) associated with each of the SSBs 1102. In one example, the designated subset of preambles associated with the one of the SSBs or the number of preamble cyclic shifts may be configured in RMSI. For instance, referring to FIGS. 4 and 12, the designated preamble subsets 1208 or number of preamble cyclic shifts 1210 may be in RMSI 414, 1206. In another example, each of the SSBs may schedule RMSI, and each of the RMSI may include a different one of the designated subset of preambles or a different number of preamble cyclic shifts. For instance, referring to FIG. 12, each of the SSBs 1202 may schedule RMSI 1206, and each of the RMSI may include designated preamble subset 1208 or number of preamble cyclic shifts 1210. In a further example, at 1508, the base station may obtain a preamble from the UE in response to one of the SSBs, where the preamble is obtained in a same RACH occasion associated with other ones of the SSBs. For example, 1508 may be performed by preamble component 1746. For instance, referring to FIG. 13, the base station 1304 may obtain preamble 1318 from UE 1302 in response to one of the simultaneous SSBs 1308 (e.g., a SSB which the UE identifies as being associated with a best beam pair), in a same RACH occasion associated with the other simultaneous SSBs 1308 (e.g., a common RACH occasion).

In either aspect, the SSBs may be sent simultaneously in response to an operating frequency range or a subcarrier spacing. For instance, referring to FIGS. 4 and 7-13, the base station 1304 may send simultaneous SSBs 1308 (e.g., SSBs 702, 802, 902, 1002, 1102, 1202) in a certain operating frequency range (e.g., operating frequency range 410) or SCS (e.g., SCS 412). In one example, the SSBs may be sent simultaneously in response to the subcarrier spacing being at least 120 kHz (or the operating frequency range being FR2 or beyond).

Figure 16:
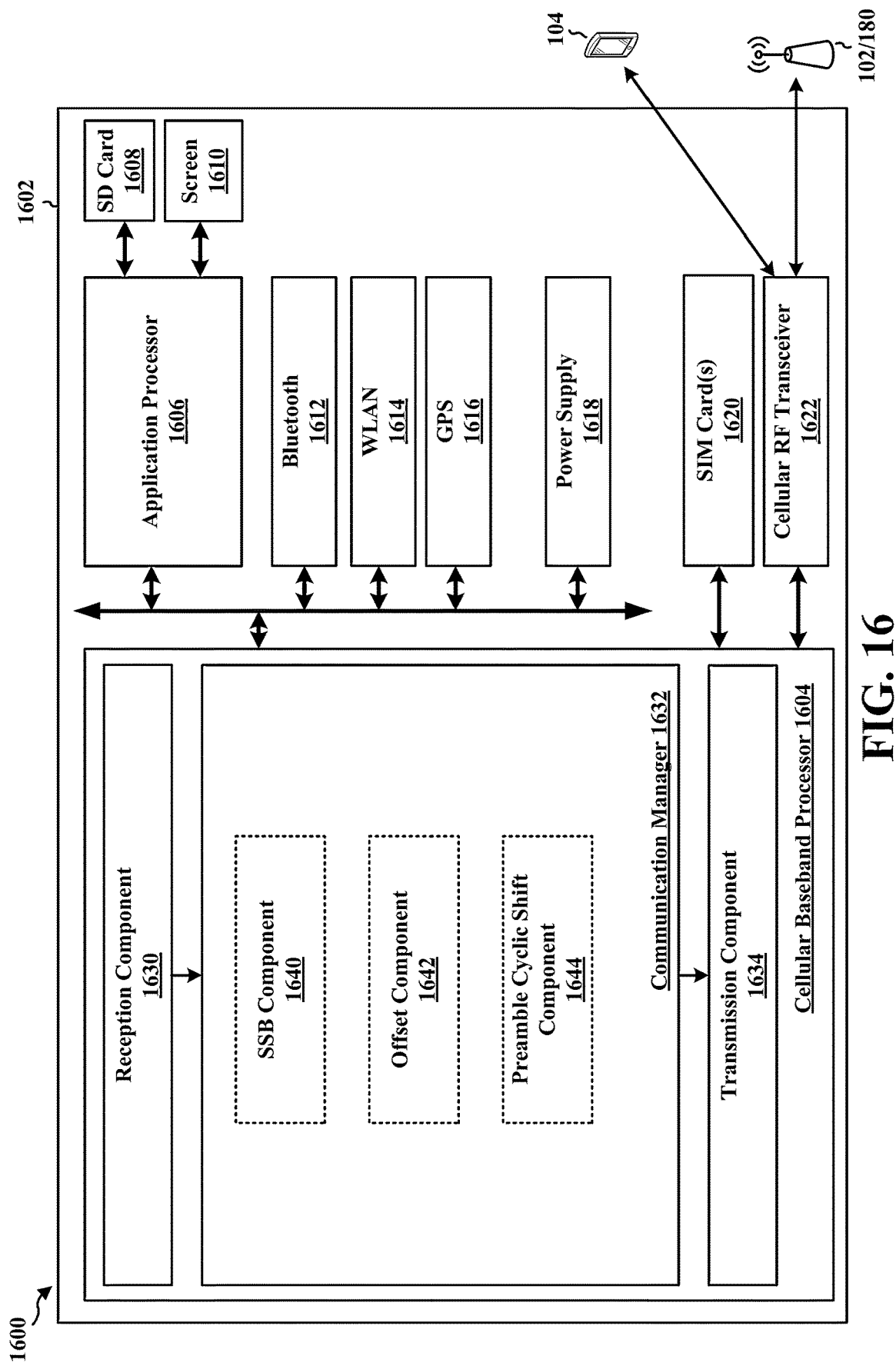
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the aforediscussed additional modules of the apparatus 1602.

The communication manager 1632 includes a SSB component 1640 that is configured to simultaneously obtain a plurality of SSBs from a base station, where each of the SSBs is associated with a different beam; and where each of the SSBs is associated with a different RACH occasion or a designated subset of preambles, e.g., as described in connection with 1402. The communication manager 1632 further includes an offset component 1642 that receives input in the form of the SSBs from the SSB component 1640 and is configured to determine an offset for one of the different RACH occasions, where the offset is a time offset or a frequency offset, e.g., as described in connection with 1404. The communication manager 1632 further includes a preamble cyclic shift component 1644 that receives input in the form of the SSBs from the SSB component 1640 and is configured to determine a number of preamble cyclic shifts associated with one of the SSBs, e.g., as described in connection with 1406.

The apparatus may include additional components that perform each of the blocks of the algorithm in the aforementioned flowcharts of FIGS. 13 and 14. As such, each block in the aforementioned flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for simultaneously obtaining a plurality of synchronization signal blocks (SSBs) from a base station, wherein each of the SSBs is associated with a different beam; and wherein each of the SSBs is associated with a different random access channel (RACH) occasion or a designated subset of preambles. In one configuration, the apparatus 1602, and in particular the cellular baseband processor 1604, may include means for determining an offset for one of the different RACH occasions, wherein the offset is a time offset or a frequency offset. In one configuration, the apparatus 1602, and in particular the cellular baseband processor 1604, may include means for determining a number of preamble cyclic shifts associated with one of the SSBs.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
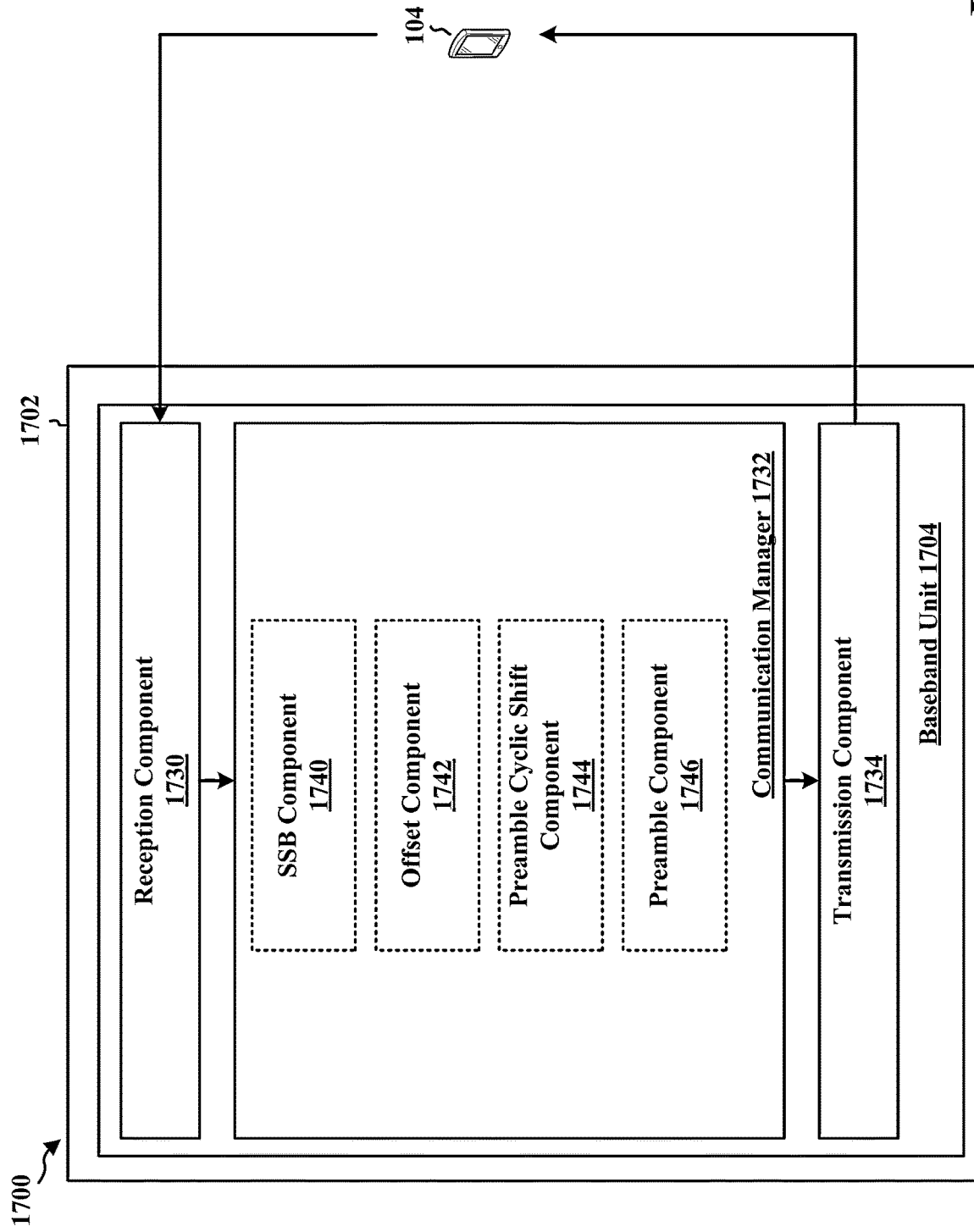
FIG. 17 is a diagram illustrating another example of a hardware implementation for another example apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the BS 310 and may include the memory 376 and/or at least one of the TX processor 316, the RX processor 370, and the controller/processor 375.

The communication manager 1732 includes a SSB component 1740 that is configured to simultaneously send a plurality of SSBs to a UE, where each of the SSBs is associated with a different beam; and where each of the SSBs is associated with a different RACH occasion or a designated subset of preambles, e.g., as described in connection with 1506. The communication manager 1732 further includes a offset component 1742 that is configured to configure an offset for one of the different RACH occasions, where the offset is a time offset or a frequency offset, e.g., as described in connection with 1502. The communication manager 1732 further includes a preamble cyclic shift component 1744 that is configured to configure a number of preamble cyclic shifts associated with one of the SSBs, e.g., as described in connection with 1504. The communication manager 1732 further includes a preamble component 1746 that is configured to obtain a preamble from the UE in response to one of the SSBs, where the preamble is obtained in a same RACH occasion associated with other ones of the SSBs, e.g., as described in connection with 1508.

The apparatus may include additional components that perform each of the blocks of the algorithm in the aforementioned flowcharts of FIGS. 13 and 15. As such, each block in the aforementioned flowcharts of FIGS. 13 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for simultaneously sending a plurality of synchronization signal blocks (SSBs) to a user equipment (UE), wherein each of the SSBs is associated with a different beam; and wherein each of the SSBs is associated with a different random access channel (RACH) occasion or a designated subset of preambles. In one configuration, the apparatus 1702, and in particular the baseband unit 1704, may include means for configuring an offset for one of the different RACH occasions, wherein the offset is a time offset or a frequency offset. In one configuration, the apparatus 1702, and in particular the baseband unit 1704, may include means for configuring a number of preamble cyclic shifts associated with one of the SSBs. In one configuration, the apparatus 1702, and in particular the baseband unit 1704, may include means for obtaining a preamble from the UE in response to one of the SSBs, wherein the preamble is obtained in a same RACH occasion associated with other ones of the SSBs.

The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow a base station (or TRP) to transmit simultaneous SSBs to a UE respectively over different beams, where such SSBs do not overlap with SSBs from other base stations (or TRPs). In this way, a UE may better detect the transmission beams carrying SSBs from different cells or TRPs. Moreover, aspects of the present disclosure allow the base station to associate different ROs or designated subsets of preambles with different simultaneously transmitted SSBs. Thus, the base station may differentiate RACH preambles received from the UE in response to simultaneously transmitted SSBs, while the UE may determine the time-frequency resources in which to transmit preambles responsive to such simultaneously transmitted SSBs. Moreover, the base station may receive preambles responsive to simultaneous SSBs in separate ROs, thus providing for improved uplink reception and beamforming.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: simultaneously obtaining a plurality of synchronization signal blocks (SSBs) from a base station, wherein each of the SSBs is associated with a different beam; and wherein each of the SSBs is associated with a different random access channel (RACH) occasion or a designated subset of preambles.

Example 2 is the method of Example 1, wherein each of the SSBs is associated with a different one of the different RACH occasions.

Example 3 is the method of any of Examples 1 and 2, further comprising: determining an offset for one of the different RACH occasions, wherein the offset is a time offset or a frequency offset.

Example 4 is the method of any of Examples 1 to 3, wherein the offset is in remaining minimum system information (RMSI) or in a physical broadcast channel (PBCH).

Example 5 is the method of any of Examples 1 to 4, wherein each of the SSBs schedules remaining minimum system information (RMSI), and each of the RMSI includes a different offset.

Example 6 is the method of Example 1, wherein each of the SSBs is associated with one of the designated subsets of preambles.

Example 7 is the method of any of Examples 1 and 6, wherein the designated subset of preambles is different for each of the SSBs.

Example 8 is the method of any of Examples 1, 6 and 7, further comprising: determining a number of preamble cyclic shifts associated with one of the SSBs.

Example 9 is the method of any of Examples 1, 6 to 8, wherein the designated subset of preambles associated with the one of the SSBs or the number of preamble cyclic shifts is in remaining minimum system information (RMSI).

Example 10 is the method of any of Examples 1, 6 to 9, wherein each the SSBs schedules remaining minimum system information (RMSI), and each of the RMSI includes a different one of the designated subset of preambles or a different number of preamble cyclic shifts.

Example 11 is the method of any of Examples 1 to 10, wherein the SSBs are obtained simultaneously in response to an operating frequency range or a subcarrier spacing.

Example 12 is the method of Example 11, wherein the SSBs are obtained simultaneously in response to the subcarrier spacing being at least 120 kHz.

Example 13 is an apparatus for wireless communication, comprising: a processor; memory coupled with the processor; and instructions stored in the memory and operable, when executed by the processor, to cause the apparatus to: simultaneously obtain a plurality of synchronization signal blocks (SSBs) from a base station, wherein each of the SSBs is associated with a different beam; and wherein each of the SSBs is associated with a different random access channel (RACH) occasion or a designated subset of preambles.

Example 14 is the apparatus of Example 13, wherein the instructions, when executed by the processor, further cause the apparatus to: determine an offset for one of the different RACH occasions, wherein the offset is a time offset or a frequency offset.

Example 15 is the apparatus of Example 13, wherein the instructions, when executed by the processor, further cause the apparatus to: determine a number of preamble cyclic shifts associated with one of the SSBs.

Example 16 is a method of wireless communication at a base station, comprising: simultaneously sending a plurality of synchronization signal blocks (SSBs) to a user equipment (UE), wherein each of the SSBs is associated with a different beam; and wherein each of the SSBs is associated with a different random access channel (RACH) occasion or a designated subset of preambles.

Example 17 is the method of Example 16, wherein each of the SSBs is associated with a different one of the different RACH occasions.

Example 18 is the method of any of Examples 16 and 17, further comprising: configuring an offset for one of the different RACH occasions, wherein the offset is a time offset or a frequency offset.

Example 19 is the method of any of Examples 16 to 18, wherein the offset is configured in remaining minimum system information (RMSI) or in a physical broadcast channel (PBCH).

Example 20 is the method of any of Examples 16 to 19, wherein each of the SSBs schedules remaining minimum system information (RMSI), and each of the RMSI includes a different offset.

Example 21 is the method of Example 16, wherein each of the SSBs is associated with one of the designated subsets of preambles.

Example 22 is the method of any of Examples 16 and 21, wherein the designated subset of preambles is different for each of the SSBs.

Example 23 is the method of any of Examples 16, 21 and 22, further comprising: configuring a number of preamble cyclic shifts associated with one of the SSBs.

Example 24 is the method of any of Examples 16, 21 to 23, wherein the designated subset of preambles associated with the one of the SSBs or the number of preamble cyclic shifts is configured in remaining minimum system information (RMSI).

Example 25 is the method of any of Examples 16, 21 to 24, wherein each of the SSBs schedules remaining minimum system information (RMSI), and each of the RMSI includes a different one of the designated subset of preambles or a different number of preamble cyclic shifts.

Example 26 is the method of any of Examples 16, 21 to 25, further comprising: obtaining a preamble from the UE in response to one of the SSBs, wherein the preamble is obtained in a same RACH occasion associated with other ones of the SSBs.

Example 27 is the method of any of Examples 16 to 26, wherein the SSBs are sent simultaneously in response to an operating frequency range or a subcarrier spacing.

Example 28 is an apparatus for wireless communication, comprising: a processor; memory coupled with the processor; and instructions stored in the memory and operable, when executed by the processor, to cause the apparatus to: simultaneously send a plurality of synchronization signal blocks (SSBs) to a user equipment (UE), wherein each of the SSBs is associated with a different beam; and wherein each of the SSBs is associated with a different random access channel (RACH) occasion or a designated subset of preambles.

Example 29 is the apparatus of Example 28, wherein the instructions, when executed by the processor, further cause the apparatus to: configure an offset for one of the different RACH occasions, wherein the offset is a time offset or a frequency offset.

Example 30 is the apparatus of Example 28, wherein the instructions, when executed by the processor, further cause the apparatus to: configure a number of preamble cyclic shifts associated with one of the SSBs.

What is claimed is:

1. A method of wireless communication at a user equipment (UE), comprising:
    simultaneously obtaining a plurality of synchronization signal blocks (SSBs) from a base station, wherein each of the SSBs is associated with a different beam and do not overlap with other simultaneous SSBs from another base station; and
    wherein each of the SSBs is associated with a different random access channel (RACH) occasion or a designated subset of preambles.

2. The method of claim 1, wherein each of the SSBs is associated with a different one of the different RACH occasions.

3. The method of claim 2, further comprising:
    determining an offset for one of the different RACH occasions, wherein the offset is a time offset or a frequency offset.

4. The method of claim 3, wherein the offset is in remaining minimum system information (RMSI) or in a physical broadcast channel (PBCH).

5. The method of claim 2, wherein each of the SSBs schedules remaining minimum system information (RMSI), and each of the RMSI includes a different offset.

6. The method of claim 1, wherein each of the SSBs is associated with one of the designated subsets of preambles.

7. The method of claim 6, wherein the designated subset of preambles is different for each of the SSBs.

8. The method of claim 6, further comprising:
    determining a number of preamble cyclic shifts associated with one of the SSBs.

9. The method of claim 8, wherein the designated subset of preambles associated with the one of the SSBs or the number of preamble cyclic shifts is in remaining minimum system information (RMSI).

10. The method of claim 6, wherein each the SSBs schedules remaining minimum system information (RMSI), and each of the RMSI includes a different one of the designated subset of preambles or a different number of preamble cyclic shifts.

11. The method of claim 1, wherein the SSBs are obtained simultaneously in response to an operating frequency range or a subcarrier spacing.

12. The method of claim 11, wherein the SSBs are obtained simultaneously in response to the subcarrier spacing being at least 120 kHz.

13. An apparatus for wireless communication, comprising:
    a processing system that includes one or more processors and one or more memories coupled with the one or more processors, the processing system configured to cause the apparatus to:
        simultaneously obtain a plurality of synchronization signal blocks (SSBs) from a base station, wherein each of the SSBs is associated with a different beam and do not overlap with other simultaneous SSBs from another base station; and
        wherein each of the SSBs is associated with a different random access channel (RACH) occasion or a designated subset of preambles.

14. The apparatus of claim 13, wherein the processing system is further configured to cause the apparatus to:
    determine an offset for one of the different RACH occasions, wherein the offset is a time offset or a frequency offset.

15. The apparatus of claim 13, wherein the processing system is further configured to cause the apparatus to:
    determine a number of preamble cyclic shifts associated with one of the SSBs.

16. A method of wireless communication at a base station, comprising:
    simultaneously sending a plurality of synchronization signal blocks (SSBs) to a user equipment (UE), wherein each of the SSBs is associated with a different beam and do not overlap with other simultaneous SSBs from another base station; and
    wherein each of the SSBs is associated with a different random access channel (RACH) occasion or a designated subset of preambles.

17. The method of claim 16, wherein each of the SSBs is associated with a different one of the different RACH occasions.

18. The method of claim 17, further comprising:
    configuring an offset for one of the different RACH occasions, wherein the offset is a time offset or a frequency offset.

19. The method of claim 18, wherein the offset is configured in remaining minimum system information (RMSI) or in a physical broadcast channel (PBCH).

20. The method of claim 17, wherein each of the SSBs schedules remaining minimum system information (RMSI), and each of the RMSI includes a different offset.

21. The method of claim 16, wherein each of the SSBs is associated with one of the designated subsets of preambles.

22. The method of claim 21, wherein the designated subset of preambles is different for each of the SSBs.

23. The method of claim 21, further comprising:
    configuring a number of preamble cyclic shifts associated with one of the SSBs.

24. The method of claim 23, wherein the designated subset of preambles associated with the one of the SSBs or the number of preamble cyclic shifts is configured in remaining minimum system information (RMSI).

25. The method of claim 21, wherein each of the SSBs schedules remaining minimum system information (RMSI), and each of the RMSI includes a different one of the designated subset of preambles or a different number of preamble cyclic shifts.

26. The method of claim 21, further comprising:
    obtaining a preamble from the UE in response to one of the SSBs, wherein the preamble is obtained in a same RACH occasion associated with other ones of the SSBs.

27. The method of claim 16, wherein the SSBs are sent simultaneously in response to an operating frequency range or a subcarrier spacing.

28. An apparatus for wireless communication, comprising:
    a processing system that includes one or more processors and one or more memories coupled with the one or more processors, the processing system configured to cause the apparatus to:
        simultaneously send a plurality of synchronization signal blocks (SSBs) to a user equipment (UE), wherein each of the SSBs is associated with a different beam and do not overlap with other simultaneous SSBs from another apparatus that is a base station; and wherein each of the SSBs is associated with a different random access channel (RACH) occasion or a designated subset of preambles.

29. The apparatus of claim 28, wherein the processing system is further configured to cause the apparatus to:
configure an offset for one of the different RACH occasions, wherein the offset is a time offset or a frequency offset.

30. The apparatus of claim 28, wherein the processing system is further configured to cause the apparatus to:
configure a number of preamble cyclic shifts associated with one of the SSBs.

* * * * *